United States Patent
Choi et al.

(10) Patent No.: US 11,477,446 B2
(45) Date of Patent: Oct. 18, 2022

(54) ENCODING METHOD AND APPARATUS THEREFOR, AND DECODING METHOD AND APPARATUS THEREFOR

(71) Applicant: SAMSUNG ELECTRONICS CO., LTD., Suwon-si (KR)

(72) Inventors: Woong-il Choi, Osan-si (KR); Sun-il Lee, Seoul (KR); Ki-ho Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/772,862

(22) PCT Filed: Mar. 29, 2018

(86) PCT No.: PCT/KR2018/003742
§ 371 (c)(1),
(2) Date: Jun. 15, 2020

(87) PCT Pub. No.: WO2019/135446
PCT Pub. Date: Jul. 11, 2019

(65) Prior Publication Data
US 2020/0329238 A1 Oct. 15, 2020

Related U.S. Application Data

(60) Provisional application No. 62/614,988, filed on Jan. 8, 2018.

(51) Int. Cl.
*H04N 19/105* (2014.01)
*H04N 19/159* (2014.01)
(Continued)

(52) U.S. Cl.
CPC ......... *H04N 19/117* (2014.11); *H04N 19/105* (2014.11); *H04N 19/159* (2014.11); *H04N 19/176* (2014.11)

(58) Field of Classification Search
CPC .................................................. H04N 19/117
See application file for complete search history.

(56) References Cited

U.S. PATENT DOCUMENTS 5,337,088 A    8/1994 Honjo
9,161,049 B2 * 10/2015 Sung ..................... H04N 19/86
(Continued)

FOREIGN PATENT DOCUMENTS

JP    2012-44535 A    3/2012
KR    10-0711725 B1   4/2007
(Continued)

OTHER PUBLICATIONS

International Search Report (PCT/ISA/210) and Written Opinion (PCT/ISA/237) dated Sep. 18, 2018 by the International Searching Authority in counterpart International Patent Application No. PCT/KR2018/003742.

(Continued)

*Primary Examiner* — Irfan Habib
(74) *Attorney, Agent, or Firm* — Sughrue Mion, PLLC

(57) ABSTRACT

Provided is a video decoding method of applying a deblocking filter to neighboring pixels adjacent to a boundary of a current block, the video decoding method including selecting a deblocking filter to be applied to the neighboring pixels from among a plurality of deblocking filters according to pixel values of the neighboring pixels and a size of the current block, and applying the selected deblocking filter to the neighboring pixels, wherein the plurality of deblocking filters include three or more deblocking filters having different ranges of neighboring pixels to which deblocking filtering is applied.

3 Claims, 24 Drawing Sheets

(51) Int. Cl.
*H04N 19/176* (2014.01)
*H04N 19/117* (2014.01)

(56) References Cited

U.S. PATENT DOCUMENTS

| | | | |
|---|---|---|---|
| 9,344,716 B2* | 5/2016 | Seregin | H04N 19/14 |
| 9,503,725 B2* | 11/2016 | Song | H04N 19/159 |
| 9,554,139 B2* | 1/2017 | Lim | H04N 19/86 |
| 9,565,436 B2* | 2/2017 | Norkin | H04N 19/46 |
| 9,787,988 B2 | 10/2017 | Song et al. | |
| 9,819,966 B2* | 11/2017 | Chong | H04N 19/14 |
| 9,872,019 B2 | 1/2018 | Song et al. | |
| 9,906,790 B2 | 2/2018 | Kim et al. | |
| 10,123,050 B2* | 11/2018 | Karczewicz | H04N 19/85 |
| 10,304,178 B2* | 5/2019 | Chen | G06V 10/752 |
| 10,623,780 B2* | 4/2020 | Norkin | H04N 19/14 |
| 10,708,592 B2* | 7/2020 | Dong | H04N 19/176 |
| 2006/0078048 A1* | 4/2006 | Bjontegaard | H04N 19/159 |
| | | | 375/E7.193 |
| 2010/0142844 A1* | 6/2010 | Pereira | H04N 19/61 |
| | | | 382/261 |
| 2011/0188574 A1* | 8/2011 | Matsuo | H04N 19/82 |
| | | | 375/E7.243 |
| 2012/0044991 A1 | 2/2012 | Mochizuki | |
| 2013/0101031 A1* | 4/2013 | Van der Auwera | H04N 19/198 |
| | | | 375/E7.193 |
| 2013/0294525 A1* | 11/2013 | Norkin | H04N 19/90 |
| | | | 375/240.24 |
| 2018/0160152 A1* | 6/2018 | Song | H04N 19/117 |
| 2018/0176601 A1 | 6/2018 | Jeong et al. | |
| 2018/0295362 A1* | 10/2018 | Tsai | H04N 19/60 |
| 2019/0306504 A1* | 10/2019 | Park | H04N 19/82 |
| 2019/0327476 A1* | 10/2019 | Lee | H04N 19/154 |
| 2020/0304827 A1* | 9/2020 | Abe | H04N 19/80 |
| 2021/0152827 A1* | 5/2021 | Park | H04N 19/159 |
| 2022/0070455 A1* | 3/2022 | Zhang | H04N 19/159 |

FOREIGN PATENT DOCUMENTS

| | | |
|---|---|---|
| KR | 10-2012-0010177 A | 2/2012 |
| KR | 10-2014-0132313 A | 11/2014 |
| KR | 10-2015-0095232 A | 8/2015 |
| KR | 10-2016-0132915 A | 11/2016 |
| WO | 2016/200242 A1 | 12/2016 |

OTHER PUBLICATIONS

Office Action dated Jun. 10, 2020 by the Korean Intellectual Property Office in counterpart Korean Patent Application No. 10-2020-7009553.

Communication dated Aug. 27, 2020 by the Korean Intellectual Property Office in counterpart Korean Patent Application No. 10-2020-7009553.

Office Action dated Jan. 6, 2021 by the Korean Intellectual Property Office in corresponding Korean Application No. 10-2020-7034053.

Communication dated Sep. 2, 2021 issued by the European Patent Office in application No. 18898883.6.

Ikeda, M., et al., "Vertical tap length reduction to reduce line memory in deblocking filter", Joint Collaborative Team on Video Coding (JCT-VC) of ITU-T SG16 WP3 and ISO/IEC JTC1/SC29/WG11, JCTVC-F215, Jul. 16, 2011, XP030228860, pp. 1-4.

Hsu, C.-W., et al., "Deblocking Filter with Reduced Pixel Line Buffers for LCU-based Processing", Joint Collaborative Team on Video Coding (JCT-VC) of ITU-T SG16 WP3 and ISO/IEC JTC1/SC29/WG11, Jul. 15, 2011, JCTVC-F053, XP030228655, pp. 1-7.

Wiegand, T., et al., "WD3: Working Draft 3 of High-Efficiency Video Coding", Joint Collaborative Team on Video Coding (JCT-VC) of ITU-T SG16 WP3 and ISO/IEC JTC1/SC29/WG11, Jun. 27, 2011, JCTVC-E603, XP030227882, 215 pages.

Singh, J., et al., "A signal adaptive filter for blocking effect reduction of JPEG compressed images", International Journal of Electronics and Communications (AEÜ), vol. 65, No. 10, 2011, XP028098253, pp. 827-839.

Communication dated Apr. 13, 2022 issued by the European Patent Office in application No. 18898883.6.

Communication dated Apr. 19, 2022 issued by the Intellectual Property India Patent Office in application No. 202027027971.

Communication dated Jun. 10, 2022 issued by the Intellectual Property India Patent Office in application No. 202128061393.

Communication dated Jun. 10, 2022 issued by the Intellectual Property India Patent Office in application No. 202128061385.

Communication dated Jun. 8, 2022 issued by the Intellectual Property India Patent Office in application No. 202128061384.

Communication dated Jun. 8, 2022 issued by the Intellectual Property India Patent Office in application No. 202128061380.

* cited by examiner

FIG. 3
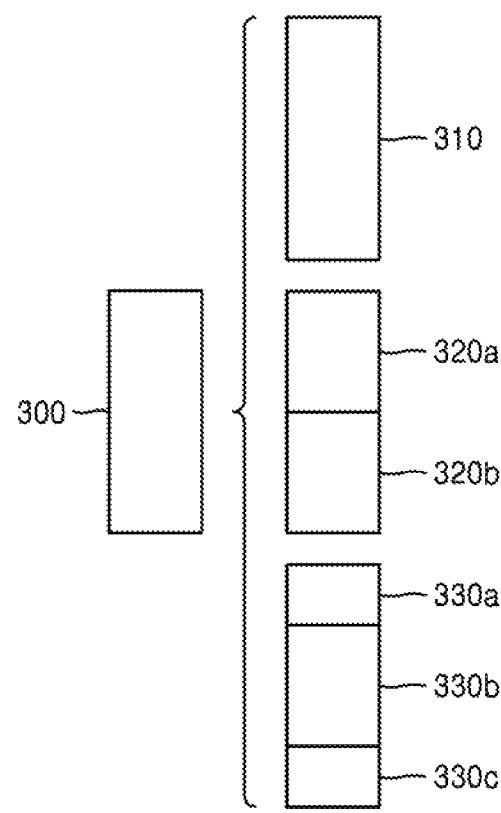
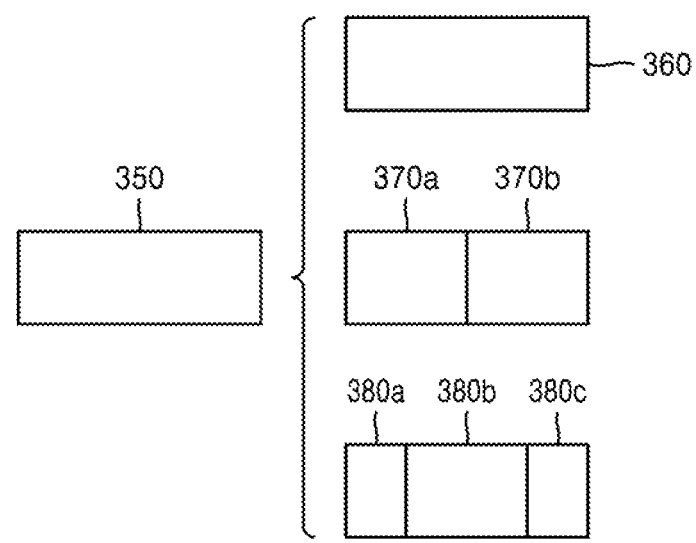

FIG. 12

| BLOCK SHAPE / DEPTH | 0: SQUARE | 1: NS_VER | 2: NS_HOR |
|---|---|---|---|
| DEPTH D | 1200 | 1210 | 1220 |
| DEPTH D+1 | 1202 | 1212 | 1222 |
| DEPTH D+2 | 1204 | 1214 | 1224 |
| ... | ... | ... | ... |

FIG. 18A

| p7,0 | p6,0 | p5,0 | p4,0 | p3,0 | p2,0 | p1,0 | p0,0 | q0,0 | q1,0 | q2,0 | q3,0 | q4,0 | q5,0 | q6,0 | q7,0 |
|------|------|------|------|------|------|------|------|------|------|------|------|------|------|------|------|
| p7,1 | p6,1 | p5,1 | p4,1 | p3,1 | p2,1 | p1,1 | p0,1 | q0,1 | q1,1 | q2,1 | q3,1 | q4,1 | q5,1 | q6,1 | q7,1 |
| p7,2 | p6,2 | p5,2 | p4,2 | p3,2 | p2,2 | p1,2 | p0,2 | q0,2 | q1,2 | q2,2 | q3,2 | q4,2 | q5,2 | q6,2 | q7,2 |
| p7,3 | p6,3 | p5,3 | p4,3 | p3,3 | p2,3 | p1,3 | p0,3 | q0,3 | q1,3 | q2,3 | q3,3 | q4,3 | q5,3 | q6,3 | q7,3 |
| p7,4 | p6,4 | p5,4 | p4,4 | p3,4 | p2,4 | p1,4 | p0,4 | q0,4 | q1,4 | q2,4 | q3,4 | q4,4 | q5,4 | q6,4 | q7,4 |
| p7,5 | p6,5 | p5,5 | p4,5 | p3,5 | p2,5 | p1,5 | p0,5 | q0,5 | q1,5 | q2,5 | q3,5 | q4,5 | q5,5 | q6,5 | q7,5 |
| p7,6 | p6,6 | p5,6 | p4,6 | p3,6 | p2,6 | p1,6 | p0,6 | q0,6 | q1,6 | q2,6 | q3,6 | q4,6 | q5,6 | q6,6 | q7,6 |
| p7,7 | p6,7 | p5,7 | p4,7 | p3,7 | p2,7 | p1,7 | p0,7 | q0,7 | q1,7 | q2,7 | q3,7 | q4,7 | q5,7 | q6,7 | q7,7 |

FIG. 18B

| p0,7 | p1,7 | p2,7 | p3,7 | p4,7 | p5,7 | p6,7 | p7,7 |
|---|---|---|---|---|---|---|---|
| p0,6 | p1,6 | p2,6 | p3,6 | p4,6 | p5,6 | p6,6 | p7,6 |
| p0,5 | p1,5 | p2,5 | p3,5 | p4,5 | p5,5 | p6,5 | p7,5 |
| p0,4 | p1,4 | p2,4 | p3,4 | p4,4 | p5,4 | p6,4 | p7,4 |
| p0,3 | p1,3 | p2,3 | p3,3 | p4,3 | p5,3 | p6,3 | p7,3 |
| p0,2 | p1,2 | p2,2 | p3,2 | p4,2 | p5,2 | p6,2 | p7,2 |
| p0,1 | p1,1 | p2,1 | p3,1 | p4,1 | p5,1 | p6,1 | p7,1 |
| p0,0 | p1,0 | p2,0 | p3,0 | p4,0 | p5,0 | p6,0 | p7,0 |
| q0,0 | q1,0 | q2,0 | q3,0 | q4,0 | q5,0 | q6,0 | q7,0 |
| q0,1 | q1,1 | q2,1 | q3,1 | q4,1 | q5,1 | q6,1 | q7,1 |
| q0,2 | q1,2 | q2,2 | q3,2 | q4,2 | q5,2 | q6,2 | q7,2 |
| q0,3 | q1,3 | q2,3 | q3,3 | q4,3 | q5,3 | q6,3 | q7,3 |
| q0,4 | q1,4 | q2,4 | q3,4 | q4,4 | q5,4 | q6,4 | q7,4 |
| q0,5 | q1,5 | q2,5 | q3,5 | q4,5 | q5,5 | q6,5 | q7,5 |
| q0,6 | q1,6 | q2,6 | q3,6 | q4,6 | q5,6 | q6,6 | q7,6 |
| q0,7 | q1,7 | q2,7 | q3,7 | q4,7 | q5,7 | q6,7 | q7,7 |

FIG. 19A

| p7 | p6 | p5 | p4 | p3 | p2 | p1 | p0 | q0 | q1 | q2 | q3 | q4 | q5 | q6 | q7 |

FIG. 19B

| p7 |
| p6 |
| p5 |
| p4 |
| p3 |
| p2 |
| p1 |
| p0 |
| q0 |
| q1 |
| q2 |
| q3 |
| q4 |
| q5 |
| q6 |
| q7 |

FIG. 20

CONDITION (1)  $|p_{2,0} - 2p_{1,0} + p_{0,0}| + |p_{2,3} - 2p_{1,3} + p_{0,3}| + |q_{2,0} - 2q_{1,0} + q_{0,0}| + |q_{2,3} - 2q_{1,3} + q_{0,3}| < \beta$ CONDITION (2)  $|p_2 - 2p_1 + p_0| + |q_2 - 2q_1 + q_0| < \dfrac{\beta}{8}$ CONDITION (3)  $|p_3 - p_0| + |q_3 - q_0| < \dfrac{\beta}{8}$ CONDITION (4)  $|p_0 - q_0| < 2.5 t_c$ CONDITION (5)  $|p_7 - p_0| + |q_7 - q_0| < \dfrac{\beta}{8}$ CONDITION (6)  Block size > 16×16

2010 BOUNDARY STRENGTH > 0 ? — NO → FILTER IS NOT APPLIED
YES ↓
2020 CONDITION (1) — NO → FILTER IS NOT APPLIED
YES ↓
2030 CONDITION (2), (3), (4) — NO → FIRST DEBLOCKING FILTER
YES ↓
2040 CONDITION (5), (6) — NO → SECOND DEBLOCKING FILTER
YES ↓
THIRD DEBLOCKING FILTER

FIG. 21

ENCODING METHOD AND APPARATUS THEREFOR, AND DECODING METHOD AND APPARATUS THEREFOR

TECHNICAL FIELD

The present disclosure relates to a video encoding method and a video decoding method, and more particularly, to a method of applying a deblocking filter to a decoded block of an image.

BACKGROUND ART

A large amount of data is required to encode high-quality video. However, a bandwidth allowed for transmission of video data is limited and thus a data rate to be applied for transmission of the video data may be limited. Thus, for efficient transmission of video data, there is a need for a method of encoding and decoding video data at a higher compression ratio while minimizing degradation of image quality.

Video data may be compressed by removing spatial redundancy and temporal redundancy between pixels. Generally, there are common features between neighboring pixels and thus encoding information is transmitted in a data unit including pixels to remove redundancy between the neighboring pixels.

Pixel values of the pixels included in the data unit are not directly transmitted but a method necessary to obtain the pixel values is transmitted. A prediction method of predicting a pixel value close to an original value is determined for each data unit, and encoding information regarding the prediction method is transmitted from an encoder to a decoder. In addition, because a predicted value is not exactly the same as the original value, residual data regarding the difference between the original value and the predicted value is transmitted from the encoder to the decoder.

As the accuracy of prediction becomes higher, the amount of encoding information required to specify the prediction method increases but the size of the residual data decreases. Therefore, a prediction method is determined in consideration of sizes of the encoding information and the residual data. In particular, data units split from a picture have various sizes. As the sizes of the data units get larger, the accuracy of prediction is likely to decrease but the amount of encoding information also decreases. Therefore, a block size is determined according to characteristics of the picture.

Prediction methods include intra prediction and inter prediction. Intra prediction is a method of predicting pixels of a block from neighboring pixels of the block. Inter prediction is a method of predicting pixels by referring to pixels of another picture referenced by a picture including a block. Therefore, spatial redundancy is removed by intra prediction and temporal redundancy is removed by inter prediction.

As the number of prediction methods increases, the amount of encoding information representing the prediction method increases. Therefore, the encoding information applied to the block may also be predicted from another block to reduce the size of the encoding information.

Because a loss of video data is allowed provided it is not perceivable to human vision, the residual data may be lossy compressed by transformation and quantization to reduce the amount of the residual data.

DESCRIPTION OF EMBODIMENTS

Technical Problem

Provided is a video encoding method of applying a deblocking filter to pixels adjacent to a boundary of a current block. Provided is also a video decoding method of applying a deblocking filter to pixels adjacent to a boundary of a current block. Provided is also a non-transitory computer-readable recording medium storing a program for executing the video encoding method and the video decoding method in a computer, according to an embodiment of the present disclosure.

Solution to Problem

Provided is a video decoding method of applying a deblocking filter to neighboring pixels adjacent to a boundary of a current block, the video decoding method including selecting a deblocking filter to be applied to the neighboring pixels from among a plurality of deblocking filters according to pixel values of the neighboring pixels and a size of the current block, and applying the selected deblocking filter to the neighboring pixels, wherein the plurality of deblocking filters include three or more deblocking filters having different ranges of neighboring pixels to which deblocking filtering is applied.

Provided is a video decoding apparatus for applying a deblocking filter to neighboring pixels adjacent to a boundary of a current block, the video decoding apparatus including a decoder configured to decode the current block according to encoding information of the current block, and a deblocking filter configured to determine whether to apply a deblocking filter to the neighboring pixels according to the encoding information of the current block and encoding information of a block neighboring the current block and pixel values of the neighboring pixels, select a deblocking filter to be applied to the adjacent pixels from a deblocking filter group including a plurality of deblocking filters according to the pixel values of the neighboring pixels when the deblocking filter is applied to the neighboring pixels, and apply the selected deblocking filter to the neighboring pixels.

Provided is a video encoding method of applying a deblocking filter to neighboring pixels adjacent to a boundary of a current block, the video encoding method including generating encoding information of the current block and encoding information of a block neighboring the current block by encoding a current picture including the current block; generating a pixel value of the current block by reconstructing the current block, based on the encoding information of the current block; determining whether to apply a deblocking filter to the neighboring pixels according to the encoding information of the current block, the encoding information of the block neighboring the current block, and pixel values of the neighboring pixels; when a deblocking filter is applied to the neighboring pixels, selecting a deblocking filter to be applied to the neighboring pixels from a deblocking filter group including a plurality of deblocking filters according to the pixel values of the neighboring pixels; and applying the selected deblocking filter to the neighboring pixels, wherein the deblocking filter group includes three or more deblocking filters having different ranges of neighboring pixels to which deblocking filtering is applied.

Provided is a video encoding apparatus for applying a deblocking filter to neighboring pixels adjacent to a boundary of a current block, the video encoding apparatus including: a decoder configured to reconstruct a current picture by using encoding information of the current block and a block neighboring the current block; a deblocking filter configured to determine whether to apply a deblocking filter to the neighboring pixels according to the encoding information of the current block, the encoding information of the neighboring block, and pixel values of the neighboring pixels, select a deblocking filter to be applied to the neighboring pixels from a deblocking filter group including a plurality of deblocking filters according to the pixel values of the neighboring pixels, when a deblocking filter is applied to the neighboring pixels, and apply the selected deblocking filter to the neighboring pixels; and an encoder configured to generate the encoding information of the current block and the encoding information of the neighboring block by encoding a current picture including the current block, wherein the deblocking filter group includes three or more deblocking filters having different ranges of neighboring pixels to which deblocking filtering is applied.

Provided is a non-transitory computer-recordable recording medium storing a program for performing the video encoding method and the video decoding method.

Aspects of the present embodiment are not limited thereto and other aspects may be derived from embodiments set forth herein.

Advantageous Effects of Disclosure

Blocking deterioration of a picture may be alleviated by performing deblocking filtering using a deblocking filter selected according to blocking deterioration of a reconstructed block. Owing to the deblocking filtering, an error between an original picture and the reconstructed picture is reduced, thereby improving not only subjective picture quality but also coding efficiency.

BRIEF DESCRIPTION OF THE DRAWINGS

FIG. 3 illustrates a process of determining at least one coding unit by splitting a non-square coding unit, according to an embodiment.

FIG. 12 illustrates a process of determining a depth of a coding unit as a shape and size of the coding unit change, when the coding unit is recursively split such that a plurality of coding units are determined, according to an embodiment.

FIGS. 18A and 18B illustrate pixels adjacent to a vertical boundary and a horizontal boundary between blocks.

FIGS. 19A and 19B illustrate pixels located at a filtering boundary filtered by a deblocking filter.

FIG. 20 is a block diagram illustrating a method of determining whether to apply deblocking filtering to pixels adjacent to a block boundary.

FIG. 21 illustrates a third deblocking filter used by a deblocking filtering unit.

BEST MODE

Figure 1A:
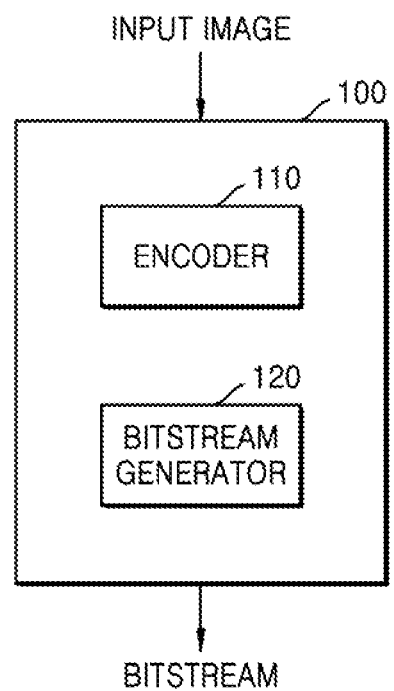
FIG. 1A is a block diagram of an image encoding apparatus based on coding units of a tree structure, according to an embodiment of the present disclosure.

Provided is a video decoding method of applying a deblocking filter to neighboring pixels adjacent to a boundary of a current block, the video decoding method including selecting a deblocking filter to be applied to the neighboring pixels from among a plurality of deblocking filters according to pixel values of the neighboring pixels and a size of the current block, and applying the selected deblocking filter to the neighboring pixels, wherein the plurality of deblocking filters include three or more deblocking filters having different ranges of neighboring pixels to which deblocking filtering is applied.

MODE OF DISCLOSURE

Advantages and features of embodiments set forth herein and methods of achieving them will be apparent from the following description of embodiments in conjunction with the accompanying drawings. However, the present disclosure is not limited to embodiments set forth herein and may be embodied in many different forms. The embodiments are merely provided so that the present disclosure will be thorough and complete and will fully convey the scope of the present disclosure to those of ordinary skill in the art.

The terms used herein will be briefly described and then embodiments set forth herein will be described in detail.

In the present specification, general terms that have been widely used nowadays are selected, when possible, in consideration of functions of the present disclosure, but nongeneral terms may be selected according to the intentions of technicians in the this art, precedents, or new technologies, etc. Some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the present disclosure.

As used herein, the singular forms "a", "an" and "the" are intended to include the plural forms as well, unless the context clearly indicates otherwise.

It will be understood that when an element is referred to as "including" another element, the element may further include other elements unless mentioned otherwise. The term "unit" used herein should be understood as software or a hardware component, such as a FPGA or an ASIC, which performs certain functions. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Functions provided in components and "units" may be combined to a small number of components and "units" or may be divided into sub-components and "sub-units".

The term "current block" refers to a coding unit, a prediction unit, or a transform unit that is being currently encoded or decoded. For convenience of explanation, when it is necessary to distinguish between other types of blocks such as a prediction unit, a transform unit, and the like, terms "current coding block", "current prediction block", and "current transform block" may be used. The term "lower block" refers to a data unit split from a "current block". The "higher block" refers to a data unit including the "current block".

The term "sample", when used herein, refers to data allocated to a sampling position of an image, i.e., data to be processed. For example, samples may be pixel values in a spatial domain, and transform coefficients in a transform domain. A unit including at least one sample may be defined as a block.

Hereinafter, embodiments of the present disclosure will be described in detail with reference to the accompanying drawings, so that the embodiments of the present disclosure may be easily implemented by those of ordinary skill in the art. For clarity, parts irrelevant to a description of the present disclosure are omitted in the drawings.

FIG. 1A is a block diagram of an image encoding apparatus 100 based on coding units of a tree structure, according to an embodiment of the present disclosure.

The image encoding apparatus 100 includes an encoder 110 and a bitstream generator 120.

The encoder 110 splits a picture or a slice included in the picture into a plurality of largest coding units according to a size of the largest coding units. The largest coding units may be data units having a size of 32×32, 64×64, 128×128, 256×256 or the like, and may be square data units, the horizontal and vertical sizes of which are $2^2$. The encoder 110 may provide the bitstream generator 120 with largest coding unit size information indicating the size of the largest coding units. The bitstream generator 120 may include the largest coding unit size information in a bitstream.

The encoder 110 determines coding units by splitting a largest coding unit. Whether to split a coding unit is determined according to whether it is efficient to split the coding unit by rate-distortion optimization. In addition, split information indicating whether the coding unit is split may be generated. The split information may be expressed in the form of a flag.

A coding unit may be split in various ways. For example, a square coding unit may be split into four square coding units, the width and height of which are half those of the square coding unit. The square coding unit may be split into two rectangular coding units having a width half that of the square coding unit. The square coding unit may be split into two rectangular coding units having a height half that of the square coding unit. The square coding unit may be split into three coding units by splitting the width or height thereof into a ratio of 1:2:1.

A rectangular coding unit having a width twice a height thereof may be split into two square coding units. A rectangular coding unit having a width twice a height thereof may be split into two square coding units having a width four times a height thereof. A rectangular coding unit having a width twice a height thereof may be split into two rectangular coding units and one square coding unit by splitting the width of the rectangular coding unit into a ratio of 1:2:1.

Similarly, a rectangular coding unit having a height twice a width thereof may be split into two square coding units. A rectangular coding unit having a height twice a width thereof may be split into two rectangular coding units having a height four times a width thereof. Similarly, a rectangular coding unit having a height twice a width thereof may be split into two rectangular coding units and one square coding unit by splitting the height of the rectangular coding unit into a ratio of 1:2:1.

When two or more split methods are applicable to the image encoding apparatus 100, information about a split method applicable to a coding unit among the split methods applicable to the image encoding apparatus 100 may be determined for each picture. Thus, it may be determined that only specific split methods are applicable to each picture. When the image encoding apparatus 100 employs only one split method, information regarding a split method applicable to a coding unit is not additionally determined.

A coding unit of a specific size may be split by a specific split method. For example, when a coding unit has a size of 256×265, the coding unit may be set to be split into only four square coding units having a width and a height which are half those of the coding unit.

When split information of a coding unit indicates that the coding unit is to be split, split type information indicating a splitting method of the coding unit may be generated. When there is only one split method applicable to a picture to which the coding unit belongs, split type information may not be generated. When a split method is determined adaptively to encoding information regarding the vicinity of the coding unit, split type information may not be generated.

As described above, image data of a current picture is split into largest coding units according to a maximum size of a coding unit. A largest coding unit may include coding units hierarchically split therefrom. A form and position of a lower coding unit may be determined according to a form into which a higher coding unit is split. A minimum size of a coding unit that limits splitting of the coding unit may be set in advance.

The encoder 110 compares coding efficiency when a coding unit is hierarchically split with coding efficiency when the coding unit is not split. The encoder 110 determines whether to split the coding unit according to a result of the comparison. When it is determined that it is more efficient to split the coding unit, the encoder 110 hierarchically splits the coding unit. The coding unit is not split when the result of the comparison reveals that it is efficient not to split the coding unit. Whether to split the coding unit may be determined independently of whether to split other coding units adjacent to the coding unit.

A coding unit that is finally split may be predicted by intra prediction or inter prediction. Intra prediction is a method of predicting samples of a prediction unit by using reference samples neighboring the prediction unit. Inter prediction is a method of predicting samples of a prediction unit by obtaining a reference sample from a reference picture referenced for a current picture.

For intra prediction, the encoder 110 may select a most efficient intra prediction method by applying a plurality of intra prediction methods to a prediction unit. Intra prediction methods include a directional mode such as a DC mode, a planar mode, a vertical mode, and a horizontal mode.

Intra prediction may be performed for each prediction unit when a reconstructed sample neighboring a coding unit is used as a reference sample. However, when a reconstructed sample in the coding unit is used as a reference sample, the reference sample in the coding unit should be reconstructed prior to prediction and thus a prediction order of the prediction units may be subordinate to a transformation order of transform units. Therefore, when the reconstructed sample in the coding unit is used as a reference sample, only an intra prediction method for transform units corresponding to the prediction units may be determined for the prediction units and intra prediction may be performed substantially for each of the transform units.

The encoder 110 may select a most efficient inter prediction method by determining an optimal motion vector and an optimal reference picture. For inter prediction, the encoder 110 may determine a plurality of motion vector candidates from coding units spatially and temporally neighboring a current coding unit, and determine a most efficient motion vector as a motion vector among the plurality of motion vector candidates. Similarly, a plurality of reference picture candidates may be determined from the coding units spatially and temporally neighboring the current coding unit, and a most efficient reference picture may be determined among the plurality of reference picture candidates. In one embodiment, a reference picture may be determined from among reference picture lists determined in advance for a current picture. In one embodiment, for accurate prediction, a most efficient motion vector among a plurality of motion vector candidates may be determined as a prediction motion vector and a motion vector may be determined by correcting the prediction motion vector. Inter prediction may be performed in parallel for each prediction unit included in a coding unit.

The encoder 110 may reconstruct a coding unit by obtaining only information representing a motion vector and a reference picture according to a skip mode. According to the skip mode, all encoding information, including a residual signal, is omitted except for the information representing the motion vector and the reference picture. Because the residual signal is omitted, the skip mode is applicable when prediction accuracy is very high.

A partition mode may be limited according to a prediction method for a prediction unit. For example, only a partition mode for prediction units having sizes of 2N×2N and N×N may be applied to intra prediction, whereas a partition mode for prediction units having sizes of 2N×2N, 2N×N, N×2N and N×N may be applied to inter prediction. Only a partition mode for a prediction unit having a size of 2N×2N may be applied to a skip mode of inter prediction. A partition mode allowed for each prediction method in the image encoding apparatus 100 may be changed according to coding efficiency.

The image encoding apparatus 100 may perform transformation based on a coding unit. The image encoding apparatus 100 may transform residual data, which is the differences between original values of pixels included in a coding unit and predicted values thereof, by a certain process. For example, the image encoding apparatus 100 may perform lossy compression on the residual data by quantization and DCT/DST transformation. Alternatively, the image encoding apparatus 100 may perform lossless compression on the residual data without quantization.

In conclusion, the encoder 110 determines a prediction method most efficient for a current coding unit among intra prediction methods and inter prediction methods. The encoder 110 determines a prediction method for the current coding unit according to coding efficiency according to a prediction result. Similarly, the encoder 110 may determine a transformation method according to coding efficiency according to a transformation result. Coding efficiency of the coding unit is finally determined according to a most efficient prediction method and a most efficient transformation method for the coding unit. The encoder 110 determines a hierarchical structure of a largest coding unit according to coding efficiency of coding units finally split from the largest coding unit.

The encoder 110 may measure coding efficiency of coding units, prediction efficiency of prediction methods, and the like by using Lagrangian multiplier-based rate-distortion optimization.

The encoder 110 may generate split information indicating whether a coding unit is split, based on the determined hierarchical structure of the largest coding unit. The encoder 110 may generate partition mode information for determining a prediction unit and transform unit split information for determining a transform unit with respect to a split coding unit. When there are two or more splitting methods of a coding unit, the encoder 110 may generate split type information, which indicates a splitting method, together with split information. In addition, the encoder 110 may generate information about a prediction method and a transformation method used for a prediction unit and a transform unit.

The bitstream generator 120 may output information, which is generated by the encoder 110 according to the hierarchical structure of the largest coding unit, in the form of a bitstream.

A method of determining a coding unit, a prediction unit, and a transform unit according to a tree structure of a largest coding unit according to an embodiment will be described in detail with reference to FIGS. 3 to 12 below.

Figure 1B:
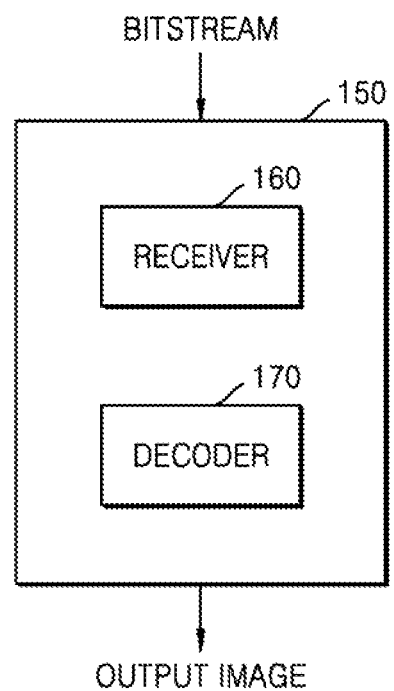
FIG. 1B is a block diagram of an image decoding apparatus based on coding units of a tree structure, according to an embodiment.

FIG. 1B is a block diagram of an image decoding apparatus 150 based on coding units of a tree structure, according to an embodiment.

The image decoding apparatus 150 includes a receiver 160 and a decoder 180.

Various terms such as "coding unit", "prediction unit", "transform unit", and various "split information" for a decoding operation of the image decoding apparatus 150 according to an embodiment are as described above with reference to FIG. 1 and the image encoding apparatus 100. The image decoding apparatus 150 is configured to restore image data and thus various encoding methods used in the image encoding apparatus 100 are applicable to the image decoding apparatus 150.

The receiver 160 receives and parses a bitstream of an encoded video. The receiver 160 extracts information necessary to decode each largest coding unit from the parsed bitstream and provides the information to the decoder 170. The receiver 160 may extract information regarding a maximum size of a coding unit of a current picture from a header, a sequence parameter set, or a picture parameter set for the current picture.

In addition, the receiver 160 extracts split information of coding units of a tree structure for each largest coding unit from the parsed bitstream. The extracted split information is output to the decoder 170. The decoder 170 may determine a tree structure of a largest coding unit by splitting the largest coding unit according to the extracted split information.

The split information extracted by the receiver 160 is split information of a tree structure determined by the image encoding apparatus 100 to generate a minimum encoding error. Therefore, the image decoding apparatus 150 may reconstruct an image by decoding data according to an encoding method that generates the minimum encoding error.

The receiver 160 may extract split information for a data unit, such as a prediction unit and a transform unit, which is included in a coding unit. For example, the receiver 160 may extract information regarding a most efficient partition mode for a prediction unit. The receiver 160 may extract transform partition information of a tree structure most efficient for a transform unit.

The receiver 1600 may obtain information regarding a prediction method most efficient for prediction units split from a coding unit. The receiver 160 may obtain information regarding a transformation method most efficient for transform units split from a coding unit.

The receiver 160 extracts information from the bitstream according to a method of configuring the bitstream by the bitstream generator 120 of the image encoding apparatus 100.

The decoder 170 may split a largest coding unit into coding units of a most efficient tree structure, based on the split information. The decoder 170 may split a coding unit into prediction units according to information regarding a partition mode. The decoder 170 may split a coding unit into transform units according to the transform split information.

The decoder 170 may predict a prediction unit according to information regarding a prediction method. The decoder 170 may perform inverse quantization and inverse transformation on residual data corresponding to the difference an original value and a predicted value of a pixel, based on information a method of transforming a transform unit. In addition, the decoder 170 may reconstruct pixels of a coding unit according to a result of predicting a prediction unit and a result of transforming a transform unit.

Figure 2:
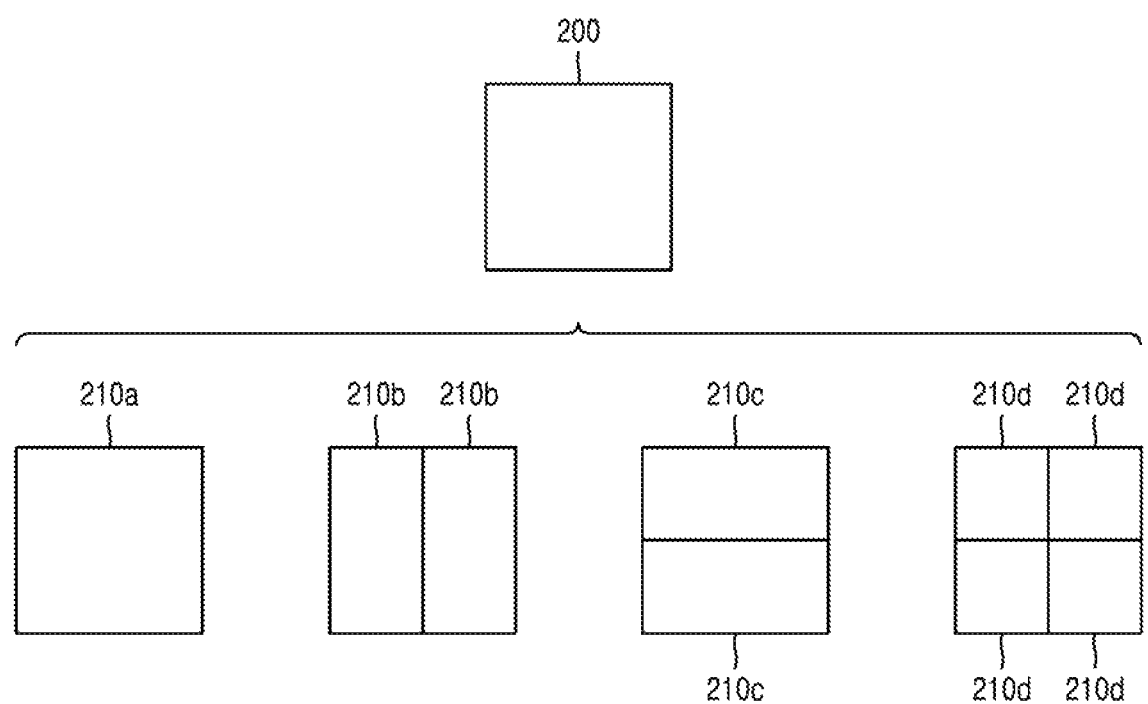
FIG. 2 illustrates a process of determining at least one coding unit by splitting a current coding unit, according to an embodiment.

FIG. 2 illustrates a process of determining at least one coding unit by splitting a current coding unit by the image decoding apparatus 150, according to an embodiment.

According to an embodiment, the image decoding apparatus 150 may determine a shape of a coding unit by using block shape information, and may determine a splitting method of the coding unit by using split shape information. That is, a coding unit splitting method indicated by the split shape information may be determined based on a block shape indicated by the block shape information used by the image decoding apparatus 150.

According to an embodiment, the image decoding apparatus 150 may use the block shape information indicating that the current coding unit has a square shape. For example, the image decoding apparatus 150 may determine whether not to split a square coding unit, whether to vertically split the square coding unit, whether to horizontally split the square coding unit, or whether to split the square coding unit into four coding units, based on the split shape information. Referring to FIG. 2, when the block shape information of a current coding unit 200 indicates a square shape, the decoder 180 may determine that a coding unit 210a having the same size as the current coding unit 200 is not split, based on the split shape information indicating not to perform splitting, or may determine coding units 210b, 210c, or 210d split based on the split shape information indicating a predetermined splitting method.

Referring to FIG. 2, according to an embodiment, the image decoding apparatus 150 may determine two coding units 210b obtained by splitting the current coding unit 200 in a vertical direction, based on the split shape information indicating to perform splitting in a vertical direction. The image decoding apparatus 150 may determine two coding units 210c obtained by splitting the current coding unit 200 in a horizontal direction, based on the split shape information indicating to perform splitting in a horizontal direction. The image decoding apparatus 150 may determine four coding units 210d obtained by splitting the current coding unit 200 in vertical and horizontal directions, based on the split shape information indicating to perform splitting in vertical and horizontal directions. However, splitting methods of the square coding unit are not limited to the above-described methods, and the split shape information may indicate various methods. Predetermined splitting methods of splitting the square coding unit will be described in detail below in relation to various embodiments.

FIG. 3 illustrates a process, performed by the image decoding apparatus 150, of determining at least one coding unit by splitting a non-square coding unit, according to an embodiment.

According to an embodiment, the image decoding apparatus 150 may use block shape information indicating that a current coding unit has a non-square shape. The image decoding apparatus 150 may determine whether not to split the non-square current coding unit or whether to split the non-square current coding unit by using a predetermined splitting method, based on split shape information. Referring to FIG. 3, when the block shape information of a current coding unit 300 or 350 indicates a non-square shape, the image decoding apparatus 150 may not split a coding unit 310 or 360 having the same size as the current coding unit 300 or 350, based on the split shape information indicating not to perform splitting, or determine coding units 320a and 320b, 330a to 330c, 370a and 370b, or 380a to 380c split based on the split shape information indicating a predetermined splitting method. Predetermined splitting methods of splitting a non-square coding unit will be described in detail below in relation to various embodiments.

According to an embodiment, the image decoding apparatus 150 may determine a splitting method of a coding unit by using the split shape information and, in this case, the split shape information may indicate the number of one or more coding units generated by splitting a coding unit. Referring to FIG. 3, when the split shape information indicates to split the current coding unit 300 or 350 into two coding units, the image decoding apparatus 150 may determine two coding units 320a and 320b, or 370a and 370b included in the current coding unit 300 or 350, by splitting the current coding unit 300 or 350 based on the split shape information.

According to an embodiment, when the image decoding apparatus 150 splits the non-square current coding unit 300 or 350 based on the split shape information, the location of a long side of the non-square current coding unit 300 or 350 may be considered. For example, the image decoding apparatus 150 may determine a plurality of coding units by splitting a long side of the current coding unit 300 or 350, in consideration of the shape of the current coding unit 300 or 350.

According to an embodiment, when the split shape information indicates to split a coding unit into an odd number of blocks, the image decoding apparatus 150 may determine an odd number of coding units included in the current coding unit 300 or 350. For example, when the split shape information indicates to split the current coding unit 300 or 350 into three coding units, the image decoding apparatus 150 may split the current coding unit 300 or 350 into three coding units 330a, 330b, and 330c, or 380a, 380b, and 380c. According to an embodiment, the image decoding apparatus 150 may determine the odd number of coding units included in the current coding unit 300 or 350, and not all the determined coding units may have the same size. For example, a predetermined coding unit 330b or 380b from among the determined odd number of coding units 330a, 330b, and 330c, or 380a, 380b, and 380c may have a size different from the size of the other coding units 330a and 330c, or 380a and 380c. In other words, coding units that may be determined by splitting the current coding unit 300 or 350 may have various types and sizes.

According to an embodiment, when the split shape information indicates to split a coding unit into the odd number of blocks, the image decoding apparatus 150 may determine the odd number of coding units included in the current coding unit 300 or 350, and in addition, may put a predetermined restriction on at least one coding unit from among the odd number of coding units generated by splitting the current coding unit 300 or 350. Referring to FIG. 3, the image decoding apparatus 150 may set a decoding process regarding the coding unit 330b or 380b located at the center among the three coding units 330a, 330b, and 330c or 380a, 380b, and 380c generated as the current coding unit 300 or 350 is split to be different from that of the other coding units 330a and 330c, or 380a or 380c. For example, the image decoding apparatus 150 may restrict the coding unit 330b or 380b at the center location to be no longer split or to be split only a predetermined number of times, unlike the other coding units 330a and 330c, or 380a and 380c.

Figure 4:
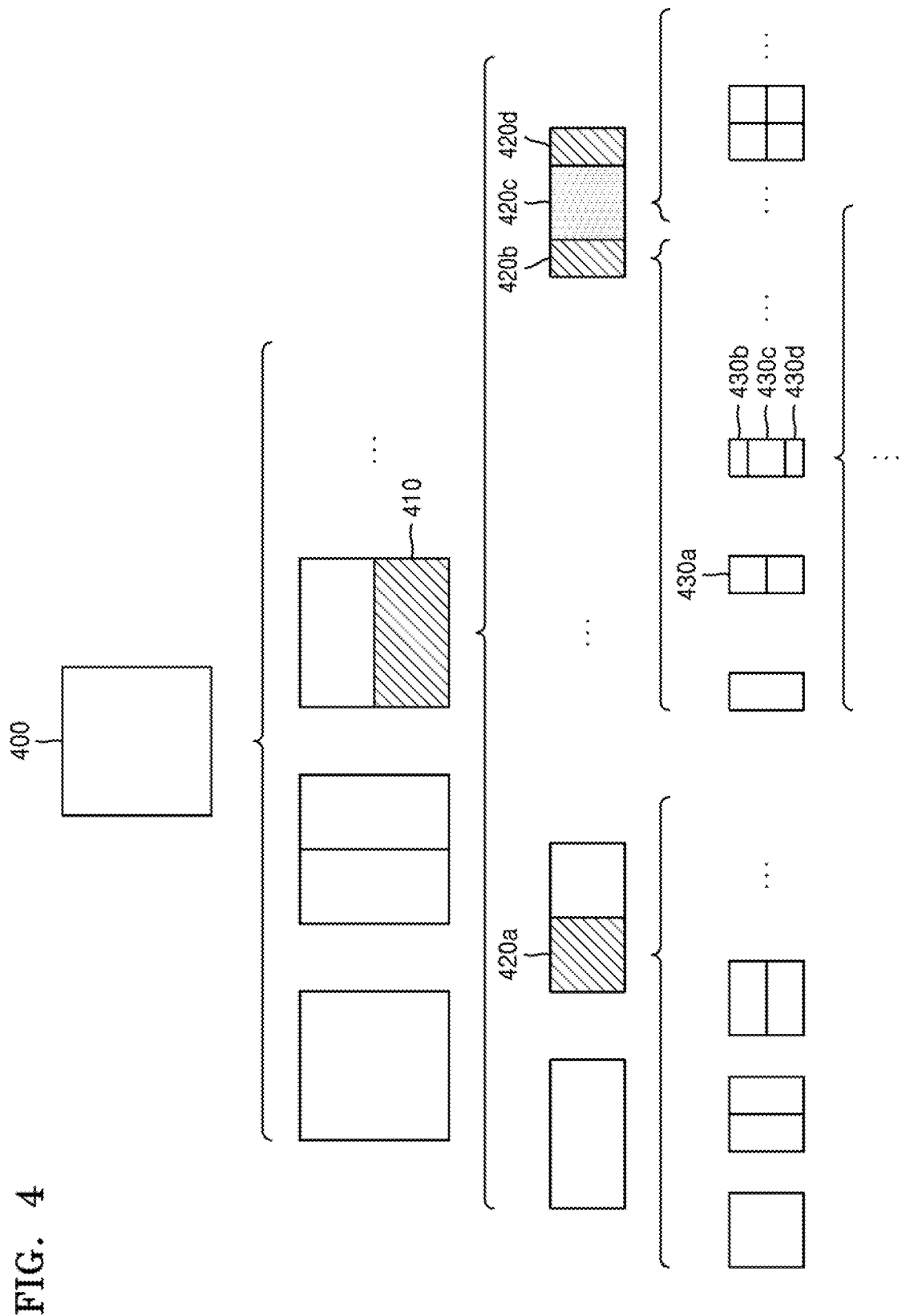
FIG. 4 illustrates a process of splitting a coding unit based on at least one of block shape information and split shape information, according to an embodiment.

FIG. 4 illustrates a process, performed by the image decoding apparatus 150, of splitting a coding unit based on at least one of block shape information and split shape information, according to an embodiment.

According to an embodiment, the image decoding apparatus 150 may determine to split or not to split a square first coding unit 400 into coding units, based on at least one of the block shape information and the split shape information. According to an embodiment, when the split shape information indicates to split the first coding unit 400 in a horizontal direction, the image decoding apparatus 150 may determine a second coding unit 410 by splitting the first coding unit 400 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 150 may determine to split or not to split the determined second coding unit 410 into coding units, based on at least one of the block shape information and the split shape information. Referring to FIG. 4, the image decoding apparatus 150 may or may not split the non-square second coding unit 410, which is determined by splitting the first coding unit 400, into one or more third coding units 420a, or 420b, 420c, and 420d based on at least one of the block shape information and the split shape information. The image decoding apparatus 150 may obtain at least one of the block shape information and the split shape information, and determine a plurality of various-shaped second coding units (e.g., 410) by splitting the first coding unit 400, based on the obtained at least one of the block shape information and the split shape information, and the second coding unit 410 may be split by using the splitting method of the first coding unit 400, based on at least one of the block shape information and the split shape information. According to an embodiment, when the first coding unit 400 is split into the second coding units 410 based on at least one of the block shape information and the split shape information of the first coding unit 400, the second coding unit 410 may also be split into the third coding units 420a, or 420b, 420c, and 420d based on at least one of the block shape information and the split shape information of the second coding unit 410. That is, a coding unit may be recursively split based on at least one of the block shape information and the split shape information of each coding unit. A method that may be used to recursively split a coding unit will be described below in relation to various embodiments.

According to an embodiment, the image decoding apparatus 150 may determine to split each of the third coding units 420a, or 420b, 420c, and 420d into coding units or not to split the second coding unit 410, based on at least one of the block shape information and the split shape information. According to an embodiment, the image decoding apparatus 150 may split the non-square second coding unit 410 into the odd number of third coding units 420b, 420c, and 420d. The image decoding apparatus 150 may put a predetermined restriction on a predetermined third coding unit from among the odd number of third coding units 420b, 420c, and 420d. For example, the image decoding apparatus 150 may restrict the third coding unit 420c at a center location from among the odd number of third coding units 420b, 420c, and 420d to be no longer split or to be split a settable number of times. Referring to FIG. 4, the image decoding apparatus 150 may restrict the third coding unit 420c, which is at the center location from among the odd number of third coding units 420b, 420c, and 420d included in the non-square second coding unit 410, to be no longer split, to be split by using a predetermined splitting method (e.g., split into only four coding units or split by using a splitting method of the second coding unit 410), or to be split only a predetermined number of times (e.g., split only n times (where n>0)). However, the restrictions on the third coding unit 420c at the center location are not limited to the above-described examples, and may include various restrictions for decoding the third coding unit 420c at the center location differently from the other third coding units 420b and 420d.

According to an embodiment, the image decoding apparatus 150 may obtain at least one of the block shape information and the split shape information, which is used to split a current coding unit, from a predetermined location in the current coding unit.

According to an embodiment, when the current coding unit is split into a certain number of coding units, the image decoding apparatus 150 may select one of the coding units. There may be various methods of selecting one of a plurality of coding units and these methods will be described below using various embodiments.

According to an embodiment, the image decoding apparatus 150 may split the current coding unit into a plurality of coding units, and may determine a coding unit at a predetermined location.

Figure 5:
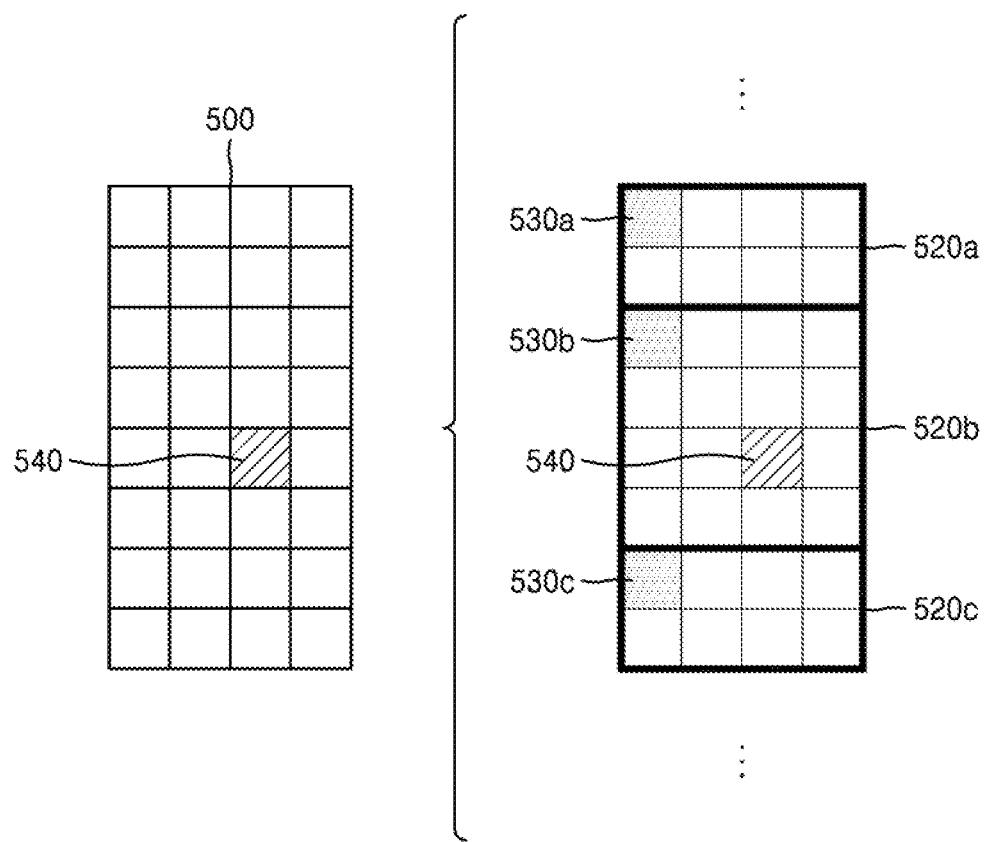
FIG. 5 illustrates a method of determining a predetermined coding unit from among an odd number of coding units, according to an embodiment.

FIG. 5 illustrates a method, performed by the image decoding apparatus 150, of determining a coding unit of a predetermined location from among an odd number of coding units, according to an embodiment.

According to an embodiment, image decoding apparatus 150 may use information indicating locations of the odd number of coding units, to determine a coding unit at a center location from among the odd number of coding units. Referring to FIG. 5, the image decoding apparatus 150 may determine an odd number of coding units 520a, 520b, and 520c by splitting the current coding unit 500. The image decoding apparatus 150 may determine a coding unit 520b at a center location by using information about locations of the odd number of coding units 520a, 520b, and 520c. For example, the image decoding apparatus 150 may determine the coding unit 520b of the center location by determining the locations of the coding units 520a, 520b, and 520c based on information indicating locations of predetermined samples included in the coding units 520a, 520b, and 520c. In detail, the image decoding apparatus 150 may determine the coding unit 520b at the center location by determining the locations of the coding units 520a, 520b, and 520c based on information indicating locations of upper left samples 530a, 530b, and 530c of the coding units 520a, 520b, and 520c.

According to an embodiment, the information indicating the locations of the upper left samples 530a, 530b, and 530c, which are included in the coding units 520a, 520b, and 520c, respectively, may include information about locations or coordinates of the coding units 520a, 520b, and 520c in a picture. According to an embodiment, the information indicating the locations of the upper left samples 530a, 530b, and 530c, which are included in the coding units 520a, 520b, and 520c, respectively, may include information indicating widths or heights of the coding units 520a, 520b, and 520c included in the current coding unit 500, and the widths or heights may correspond to information indicating differences between the coordinates of the coding units 520a, 520b, and 520c in the picture. That is, the image decoding apparatus 150 may determine the coding unit 520b at the center location by directly using the information about the locations or coordinates of the coding units 520a, 520b, and 520c in the picture, or by using the information about the widths or heights of the coding units, which correspond to the difference values between the coordinates.

According to an embodiment, information indicating the location of the upper left sample 530a of the upper coding unit 520a may include coordinates (xa, ya), information indicating the location of the upper left sample 530b of the middle coding unit 520b may include coordinates (xb, yb), and information indicating the location of the upper left sample 530c of the lower coding unit 520c may include coordinates (xc, yc). The image decoding apparatus 150 may determine the middle coding unit 520b by using the coordinates of the upper left samples 530a, 530b, and 530c which are included in the coding units 520a, 520b, and 520c, respectively. For example, when the coordinates of the upper left samples 530a, 530b, and 530c are sorted in an ascending or descending order, the coding unit 520b including the coordinates (xb, yb) of the sample 530b at a center location may be determined as a coding unit at a center location from among the coding units 520a, 520b, and 520c determined by splitting the current coding unit 500. However, the coordinates indicating the locations of the upper left samples 530a, 530b, and 530c may include coordinates indicating absolute locations in the picture, or may use coordinates (dxb, dyb) indicating a relative location of the upper left sample 530b of the middle coding unit 520b and coordinates (dxc, dyc) indicating a relative location of the upper left sample 530c of the lower coding unit 520c with reference to the location of the upper left sample 530a of the upper coding unit 520a. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 150 may split the current coding unit 500 into a plurality of coding units 520a, 520b, and 520c, and may select one of the coding units 520a, 520b, and 520c based on a predetermined criterion. For example, the image decoding apparatus 150 may select the coding unit 520b, which has a size different from that of the others, from among the coding units 520a, 520b, and 520c.

According to an embodiment, the image decoding apparatus 150 may determine the width or height of each of the coding units 520a, 520b, and 520c by using the coordinates (xa, ya) that is the information indicating the location of the upper left sample 530a of the upper coding unit 520a, the coordinates (xb, yb) that is the information indicating the location of the upper left sample 530b of the middle coding unit 520b, and the coordinates (xc, yc) that is the information indicating the location of the upper left sample 530c of the lower coding unit 520c. The image decoding apparatus 150 may determine the respective sizes of the coding units 520a, 520b, and 520c by using the coordinates (xa, ya), (xb, yb), and (xc, yc) indicating the locations of the coding units 520a, 520b, and 520c.

According to an embodiment, the image decoding apparatus 150 may determine the width of the upper coding unit 520a to be xb-xa and determine the height thereof to be yb-ya. According to an embodiment, the image decoding apparatus 150 may determine the width of the middle coding unit 520b to be xc-xb and determine the height thereof to be yc-yb. According to an embodiment, the image decoding apparatus 150 may determine the width or height of the lower coding unit 520c by using the width or height of the current coding unit 500, and the widths or heights of the upper and middle coding units 520a and 520b. The image decoding apparatus 150 may determine a coding unit, which has a size different from that of the others, based on the determined widths and heights of the coding units 520a to 520c. Referring to FIG. 5, the image decoding apparatus 150 may determine the middle coding unit 520b, which has a size different from the size of the upper and lower coding units 520a and 520c, as the coding unit of the predetermined location. However, the above-described method, performed by the image decoding apparatus 150, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described upper left locations, and information about arbitrary locations of samples included in the coding units may be used.

According to an embodiment, the image decoding apparatus 150 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 150 may determine the coding unit at the predetermined location in a horizontal direction. That is, the image decoding apparatus 150 may determine one of coding units at different locations in a horizontal direction and put a restriction on the coding unit. When the current coding unit has a non-square shape, a height of which is longer than a width, the image decoding apparatus 150 may determine the coding unit at the predetermined location in a vertical direction. That is, the image decoding apparatus 150 may determine one of coding units at different locations in a vertical direction and put a restriction on the coding unit.

According to an embodiment, the image decoding apparatus 150 may use information indicating respective locations of an even number of coding units, to determine the coding unit at the predetermined location from among the even number of coding units. The image decoding apparatus 150 may determine an even number of coding units by splitting the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 5, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 150 may use at least one of block shape information and split shape information, which is stored in a sample included in a coding unit at a center location, in a splitting operation to determine the coding unit at the center location from among the plurality of coding units determined by splitting the current coding unit.

Referring to FIG. 5, the image decoding apparatus 150 may split the current coding unit 500 into a plurality of coding units 520a, 520b, and 520c based on at least one of the block shape information and the split shape information, and may determine the coding unit 520b at a center location from among the plurality of the coding units 520a, 520b, and 520c. Furthermore, the image decoding apparatus 150 may determine the coding unit 520b at the center location, in consideration of a location from which at least one of the block shape information and the split shape information is obtained. That is, at least one of the block shape information and the split shape information of the current coding unit 500 may be obtained from the sample 540 at a center location of the current coding unit 500 and, when the current coding unit 500 is split into the plurality of coding units 520a, 520b, and 520c based on at least one of the block shape information and the split shape information, the coding unit 520b including the sample 540 may be determined as the coding unit at the center location. However, information used to determine the coding unit at the center location is not limited to at least one of the block shape information and the split shape information, and various types of information may be used to determine the coding unit at the center location.

According to an embodiment, predetermined information for identifying the coding unit at the predetermined location may be obtained from a predetermined sample included in a coding unit to be determined. Referring to FIG. 5, the image decoding apparatus 150 may use at least one of the block shape information and the split shape information, which is obtained from a sample at a predetermined location in the current coding unit 500 (e.g., a sample at a center location of the current coding unit 500) to determine a coding unit at a predetermined location from among the plurality of the coding units 520a, 520b, and 520c determined by splitting the current coding unit 500 (e.g., a coding unit at a center location from among a plurality of split coding units). That is, the image decoding apparatus 150 may determine the sample at the predetermined location by considering a block shape of the current coding unit 500, determine the coding unit 520b including a sample, from which predetermined information (e.g., at least one of the block shape information and the split shape information) may be obtained, from among the plurality of coding units 520a, 520b, and 520c determined by splitting the current coding unit 500, and may put a predetermined restriction on the coding unit 520b. Referring to FIG. 56, according to an embodiment, the image decoding apparatus 150 may determine the sample 540 at the center location of the current coding unit 500 as the sample from which the predetermined information may be obtained, and may put a predetermined restriction on the coding unit 520b including the sample 540, in a decoding operation. However, the location of the sample from which the predetermined information may be obtained is not limited to the above-described location, and may include arbitrary locations of samples included in the coding unit 520b to be determined for a restriction.

According to an embodiment, the location of the sample from which the predetermined information may be obtained may be determined based on the shape of the current coding unit 500. According to an embodiment, the block shape information may indicate whether the current coding unit has a square or non-square shape, and the location of the sample from which the predetermined information may be obtained may be determined based on the shape. For example, the image decoding apparatus 150 may determine a sample located on a boundary for splitting at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 150 may determine one of samples adjacent to a boundary for splitting a long side of the current coding unit in half, as the sample from which the predetermined information may be obtained.

According to an embodiment, when the current coding unit is split into a plurality of coding units, the image decoding apparatus 150 may use at least one of the block shape information and the split shape information to determine a coding unit at a predetermined location from among the plurality of coding units. According to an embodiment, the image decoding apparatus 150 may obtain at least one of the block shape information and the split shape information from a sample at a predetermined location in a coding unit, and split the plurality of coding units, which are generated by splitting the current coding unit, by using at least one of the split shape information and the block shape information, which is obtained from the sample of the predetermined location in each of the plurality of coding units. That is, a coding unit may be recursively split based on at least one of the block shape information and the split shape information, which is obtained from the sample at the predetermined location in each coding unit. An operation of recursively splitting a coding unit has been described above in relation to FIG. 4, and thus detailed descriptions thereof will not be provided here.

According to an embodiment, the image decoding apparatus 150 may determine one or more coding units by splitting the current coding unit, and may determine an order of decoding the one or more coding units, based on a predetermined block (e.g., the current coding unit).

Figure 6:
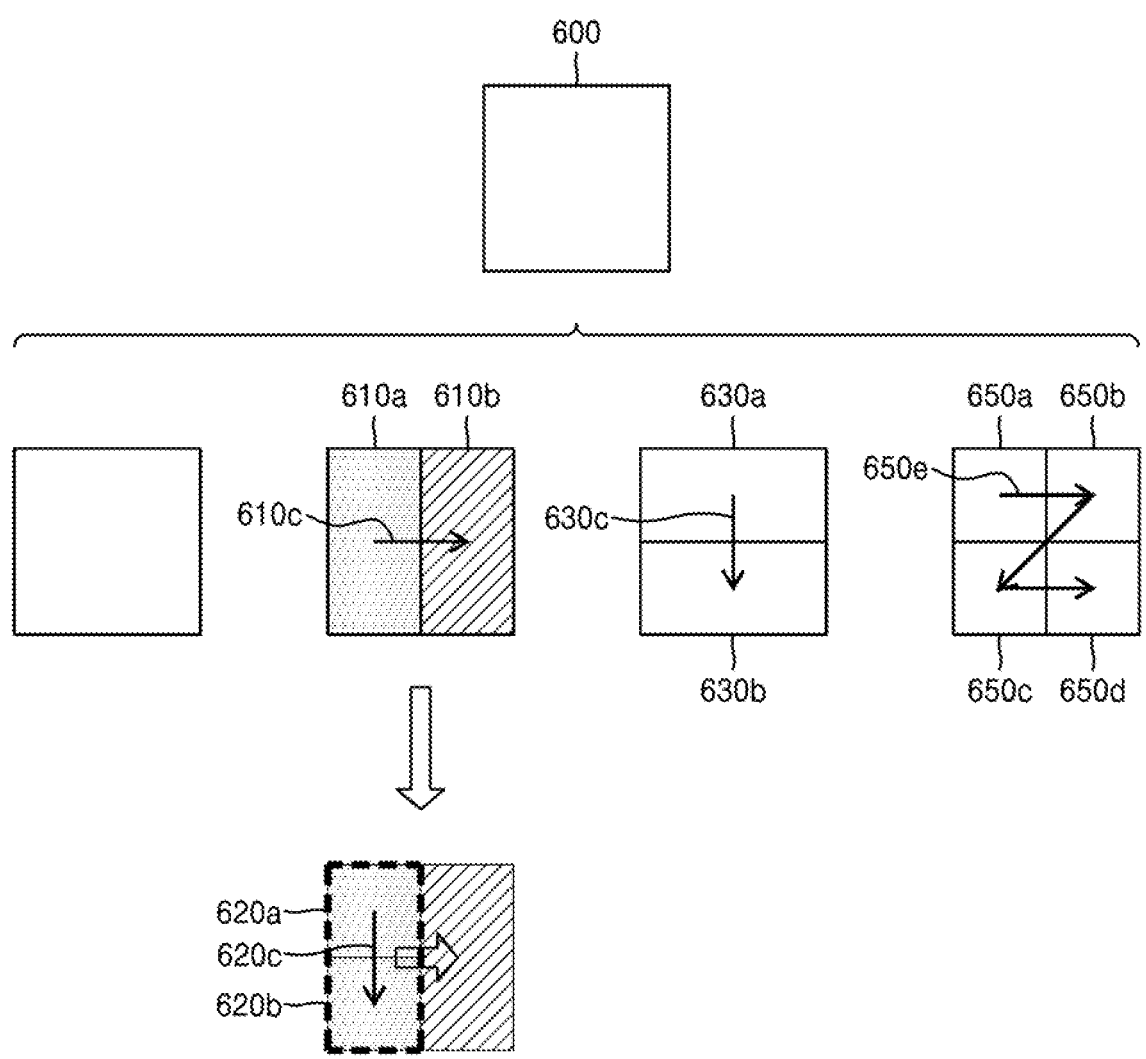
FIG. 6 illustrates an order of processing a plurality of coding units when the plurality of coding units are determined by splitting a current coding unit, according to an embodiment.

FIG. 6 illustrates an order of processing a plurality of coding units when the image decoding apparatus 150 determines the plurality of coding units by splitting a current coding unit, according to an embodiment.

According to an embodiment, the image decoding apparatus 150 may determine second coding units 610a and 610b by splitting a first coding unit 600 in a vertical direction, determine second coding units 630a and 630b by splitting the first coding unit 600 in a horizontal direction, or determine second coding units 650a to 650d by splitting the first coding unit 600 in vertical and horizontal directions, based on block shape information and split shape information.

Referring to FIG. 6, the image decoding apparatus 150 may determine to process the second coding units 610a and 610b, which are determined by splitting the first coding unit 600 in a vertical direction, in a horizontal direction order 610c. The image decoding apparatus 150 may determine to process the second coding units 630a and 630b, which are determined by splitting the first coding unit 600 in a horizontal direction, in a vertical direction order 630c. The image decoding apparatus 150 may determine to process the second coding units 650a to 650d, which are determined by splitting the first coding unit 600 in vertical and horizontal directions, in a predetermined order for processing coding units in a row and then processing coding units in a next row (e.g., in a raster scan order or Z-scan order 650e).

According to an embodiment, the image decoding apparatus 150 may recursively split coding units. Referring to FIG. 6, the image decoding apparatus 150 may determine the plurality of coding units 610a and 610b, 630a and 630b, or 650a to 650d by splitting the first coding unit 600, and recursively split each of the determined plurality of coding units 610b, 630a and 630b, or 650a to 650d. A splitting method of the plurality of coding units 610b, 630a and 630b, or 650a to 650d may correspond to a splitting method of the first coding unit 600. As such, each of the plurality of coding units 610b, 630a and 630b, or 650a to 650d may be independently split into a plurality of coding units. Referring to FIG. 6, the image decoding apparatus 150 may determine the second coding units 610a and 610b by splitting the first coding unit 600 in a vertical direction, and may determine to independently split or not to split each of the second coding units 610a and 610b.

According to an embodiment, the image decoding apparatus 150 may determine third coding units 620a and 620b by splitting the left second coding unit 610a in a horizontal direction, and may not split the right second coding unit 610b.

According to an embodiment, a processing order of coding units may be determined based on an operation of splitting a coding unit. In other words, a processing order of split coding units may be determined based on a processing order of coding units immediately before being split. The image decoding apparatus 150 may determine a processing order of the third coding units 620a and 620b determined by splitting the left second coding unit 610a, independently of the right second coding unit 610b. Because the third coding units 620a and 620b are determined by splitting the left second coding unit 610a in a horizontal direction, the third coding units 620a and 620b may be processed in a vertical direction order 620c. Because the left and right second coding units 610a and 610b are processed in the horizontal direction order 610c, the right second coding unit 610b may be processed after the third coding units 620a and 620b included in the left second coding unit 610a are processed in the vertical direction order 620c. An operation of determining a processing order of coding units based on a coding unit before being split is not limited to the above-described example, and various methods may be used to independently process coding units, which are split and determined to various shapes, in a predetermined order.

Figure 7:
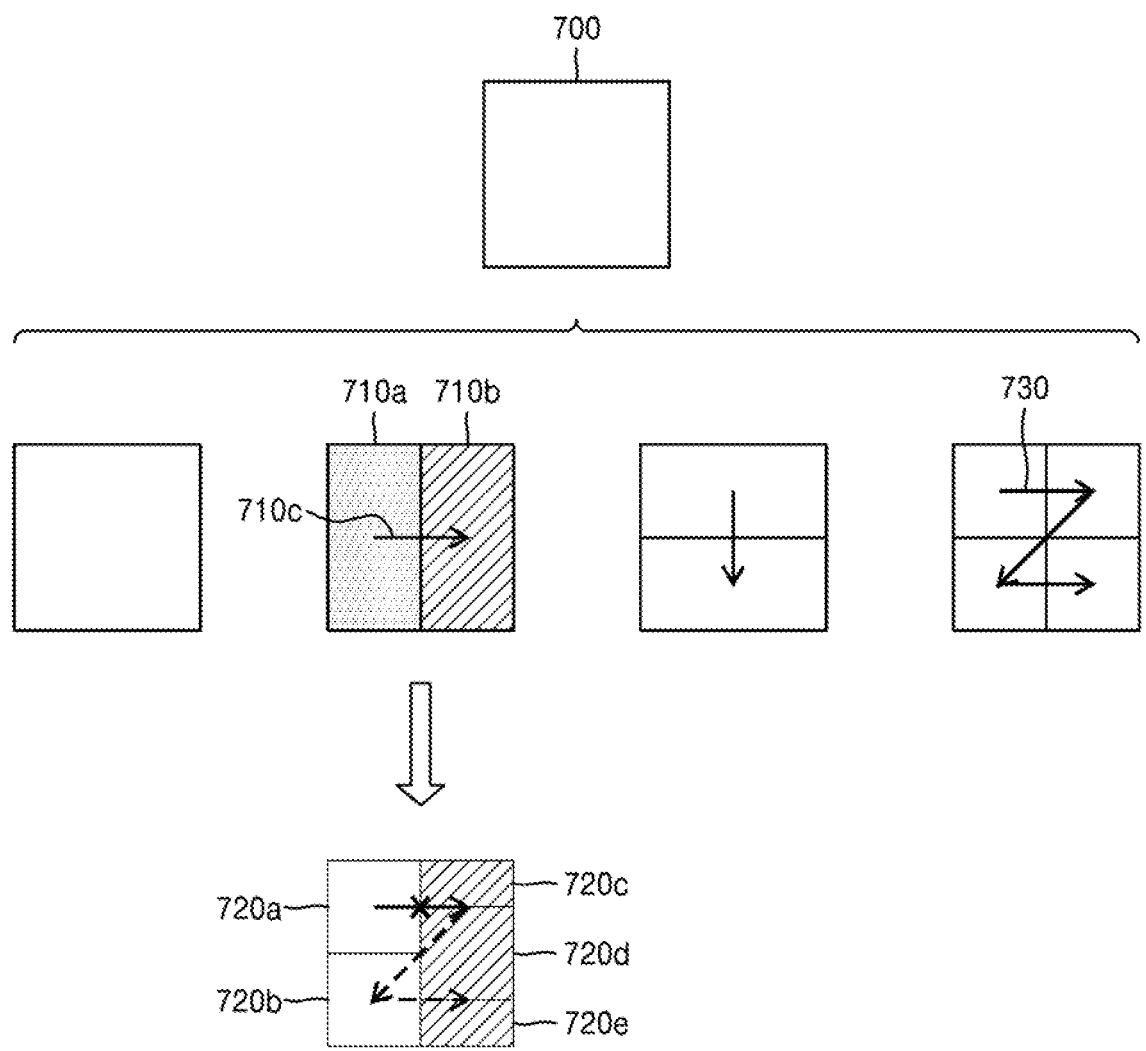
FIG. 7 illustrates a process of determining that a current coding unit is to be split into an odd number of coding units, when the coding units are not processable in a predetermined order, according to an embodiment.

FIG. 7 illustrates a process, performed by the image decoding apparatus 150, of determining that a current coding unit is to be split into an odd number of coding units, when the coding units are not processable in a predetermined order, according to an embodiment.

According to an embodiment, the image decoding apparatus 150 may determine whether the current coding unit is split into an odd number of coding units, based on obtained block shape information and split shape information. Referring to FIG. 7, a square first coding unit 700 may be split into non-square second coding units 710a and 710b, and the second coding units 710a and 710b may be independently split into third coding units 720a and 720b, and 720c to 720e. According to an embodiment, the image decoding apparatus 150 may determine the plurality of third coding units 720a and 720b by splitting the left second coding unit 710a in a horizontal direction, and may split the right second coding unit 710b into the odd number of third coding units 720c to 720e.

According to an embodiment, the image decoding apparatus 150 may determine whether any coding unit is split into an odd number of coding units, by determining whether the third coding units 720a and 720b, and 720c to 720e are processable in a predetermined order. Referring to FIG. 7, the image decoding apparatus 150 may determine the third coding units 720a and 720b, and 720c to 720e by recursively splitting the first coding unit 700. The image decoding apparatus 150 may determine whether any of the first coding unit 700, the second coding units 710a and 710b, and the third coding units 720a and 720b, and 720c to 720e are split into an odd number of coding units, based on at least one of the block shape information and the split shape information. For example, the right second coding unit 710b among the second coding units 710a and 710b may be split into an odd number of third coding units 720c, 720d, and 720e. A processing order of a plurality of coding units included in the first coding unit 700 may be a predetermined order (e.g., a Z-scan order 730), and the image decoding apparatus 150 may determine whether the third coding units 720c, 720d, and 720e, which are determined by splitting the right second coding unit 710b into an odd number of coding units, satisfy a condition for processing in the predetermined order.

According to an embodiment, the image decoding apparatus 150 may determine whether the third coding units 720a and 720b, and 720c to 720e included in the first coding unit 700 satisfy the condition for processing in the predetermined order, and the condition relates to whether at least one of a width and height of the second coding units 710a and 710b is split in half along a boundary of the third coding units 720a and 720b, and 720c to 720e. For example, the third coding units 720a and 720b determined by dividing the height of the non-square left second coding unit 710a in half satisfy the condition. However, because boundaries of the third coding units 720c to 720e determined by splitting the right second coding unit 710b into three coding units do not divide the width or height of the right second coding unit 710b in half, it may be determined that the third coding units 720c to 720e do not satisfy the condition. When the condition is not satisfied as described above, the image decoding apparatus 150 may decide disconnection of a scan order, and determine that the right second coding unit 710b is split into an odd number of coding units, based on a result of the decision. In one embodiment, in the image decoding apparatus 150, when a coding unit is split into an odd number of coding units, a certain limit may be placed on a coding unit at a certain position among the odd number of coding units, and the limit or the position is as described above using various embodiments and thus a detailed description thereof will be omitted here.

Figure 8:
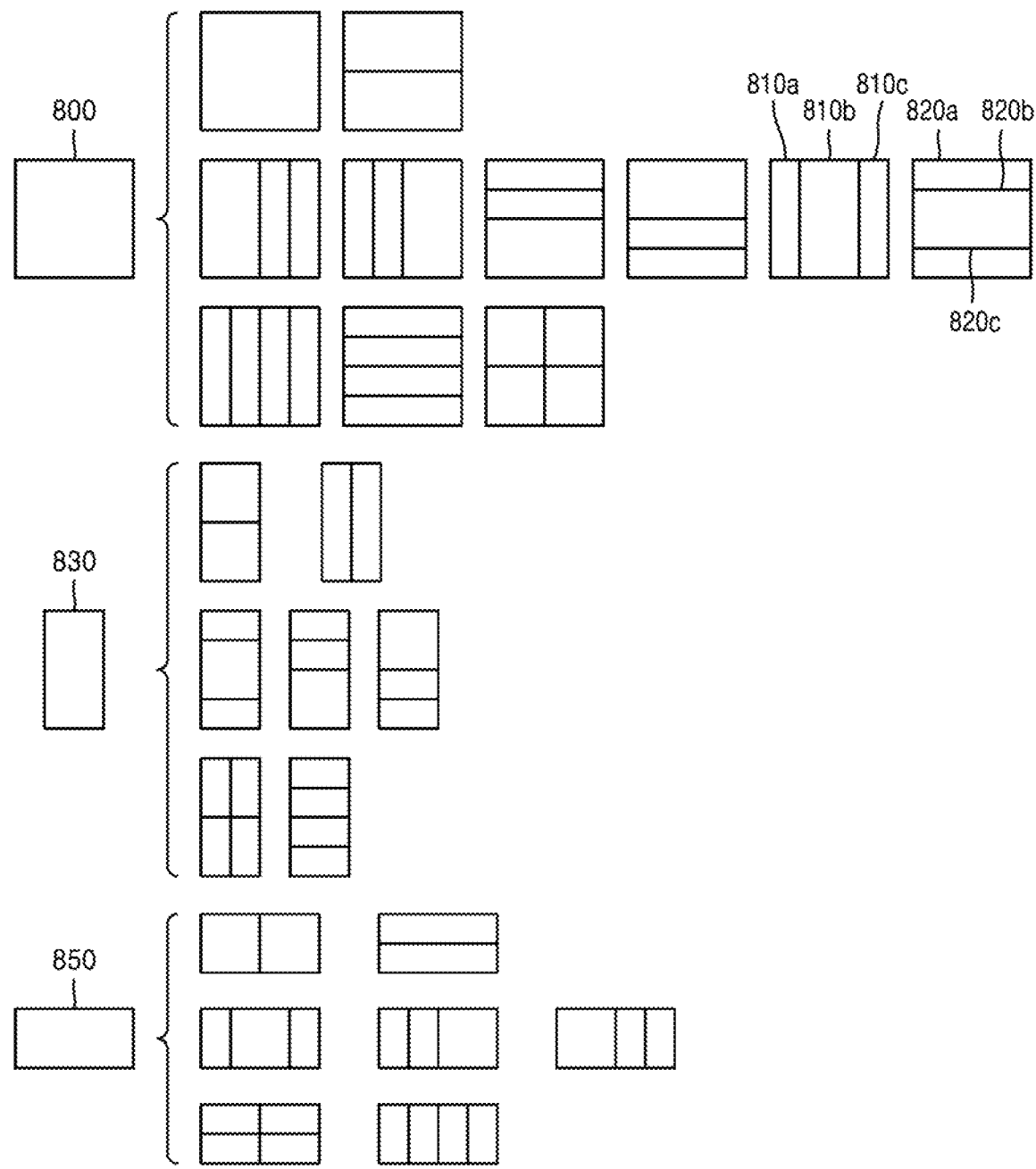
FIG. 8 illustrates a process of determining at least one coding unit by splitting a first coding unit, according to an embodiment.

FIG. 8 illustrates a process of determining at least one coding unit by splitting a first coding unit 800, the process being performed by the image decoding apparatus 150, according to an embodiment. According to an embodiment, the image decoding apparatus 150 may split the first coding unit 800, based on at least one of block shape information or split type information, which is obtained by the receiver 160. The square first coding unit 800 may be split into four square coding units or into a plurality of non-square coding units. For example, referring to FIG. 8, when the block shape information indicates that the first coding unit 1600 has a square shape and the split type information indicates to split the first coding unit 800 into non-square coding units, the image decoding apparatus 150 may split the first coding unit 800 into a plurality of non-square coding units. In detail, when the split type information indicates to determine an odd number of coding units by splitting the first coding unit 800 in a horizontal direction or a vertical direction, the image decoding apparatus 150 may split the square first coding unit 800 into an odd number of coding units, e.g., second coding units 810a, 810b, and 810c determined by splitting the square first coding unit 8600 in the vertical direction or second coding units 820a, 820b, and 820c determined by splitting the square first coding unit 800 in the horizontal direction.

According to one embodiment, the image decoding apparatus 150 may determine whether the second coding units 810a, 810b, 810c, 820a, 820b, and 820c included in the first coding unit 800 satisfy a condition for processing in a certain order, and the condition relates to whether at least one of a width or height of the first coding unit 800 is split in half by boundaries of the second coding units 810a, 810b, 810c, 820a, 820b, and 820c. Referring to FIG. 8, because the width of the first coding unit 1600 cannot be split in half by the boundaries of the second coding units 810a, 810b, and 810c determined by splitting the square first coding unit 800 in the vertical direction, it may be determined that the first coding unit 800 does not satisfy the condition for processing in the certain order. In addition, because the width of the first coding unit 800 cannot be split in half by the boundaries of the second coding units 820a, 820b, and 820c determined by splitting the square first coding unit 800 in the horizontal direction, it may be determined that the first coding unit 800 does not satisfy the condition for processing in the certain order. When the condition is not satisfied as described above, the image decoding apparatus 150 may determine disconnection of a scan order and determine that the first coding unit 800 is to be split into an odd number of coding units, based on a result of the determination. In one embodiment, in the image decoding apparatus 150, when a coding unit is split into an odd number of coding units, a certain limit may be placed on a coding unit at a certain position among the odd number of coding units, and the limit or the position is as described above using various embodiments and thus a detailed description thereof will be omitted here.

According to one embodiment, the image decoding apparatus 150 may determine various-shaped coding units by splitting a first coding unit.

Referring to FIG. 8, the image decoding apparatus 150 may split the square first coding unit 800 and a non-square first coding unit 830 or 850 into various-shaped coding units.

Figure 9:
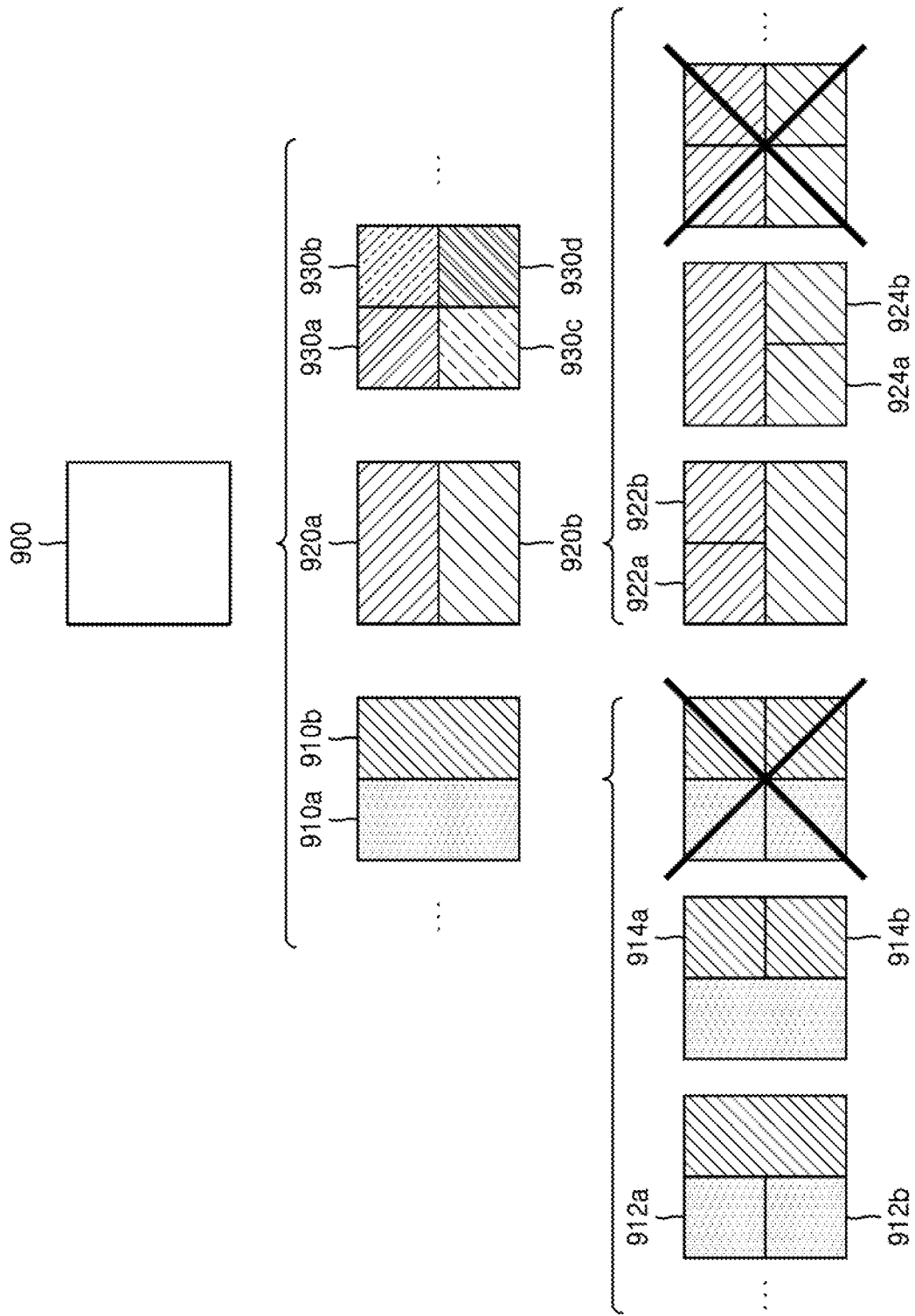
FIG. 9 illustrates that a shape into which a second coding unit is splittable is restricted when the second coding unit having a non-square shape, which is determined by splitting a first coding unit, satisfies a predetermined condition, according to an embodiment.

FIG. 9 illustrates a case in which when a non-square second coding unit determined by splitting a first coding unit 900 by the image decoding apparatus 150 satisfies a certain condition, a shape into which the second coding unit may be split is limited, according to an embodiment.

According to an embodiment, the image decoding apparatus 150 may determine to split the square first coding unit 900 into non-square second coding units 910a, 910b, 920a, and 920b, based on at least one of block shape information and split shape information, which is obtained by the receiver 160. The second coding units 910a and 910b or 920a and 920b may be independently split. As such, the image decoding apparatus 150 may determine to split or not to split the second coding units 910a, 910b, 920a, and 920b into a plurality of coding units, based on at least one of the block shape information and the split shape information of each of the second coding units 910a, 910b, 920a, and 920b. According to an embodiment, the image decoding apparatus 150 may determine third coding units 912a and 912b by splitting the non-square left second coding unit 910a, which is determined by splitting the first coding unit 900 in a vertical direction, in a horizontal direction. However, when the left second coding unit 910a is split in a horizontal direction, the image decoding apparatus 150 may restrict the right second coding unit 910*b* to not be split in a horizontal direction in which the left second coding unit 910*a* is split. When third coding units 914*a* and 914*b* are determined by splitting the right second coding unit 910*b* in a same direction, because the left and right second coding units 910*a* and 910*b* are independently split in a horizontal direction, the third coding units 912*a* and 912*b* or 914*a* and 914*b* may be determined. However, this case serves equally as a case in which the image decoding apparatus 150 splits the first coding unit 900 into four square second coding units 930*a*, 930*b*, 930*c*, and 930*d*, based on at least one of the block shape information and the split shape information, and may be inefficient in terms of image decoding.

According to an embodiment, the image decoding apparatus 150 may determine third coding units 922*a* and 922*b* or 924*a* and 924*b* by splitting the non-square second coding unit 920*a* or 920*b*, which is determined by splitting the first coding unit 900 in a horizontal direction, in a vertical direction. However, when a second coding unit (e.g., the upper second coding unit 920*a*) is split in a vertical direction, for the above-described reason, the image decoding apparatus 150 may restrict the other second coding unit (e.g., the lower second coding unit 920*b*) to not be split in a vertical direction in which the upper second coding unit 920*a* is split.

Figure 10:
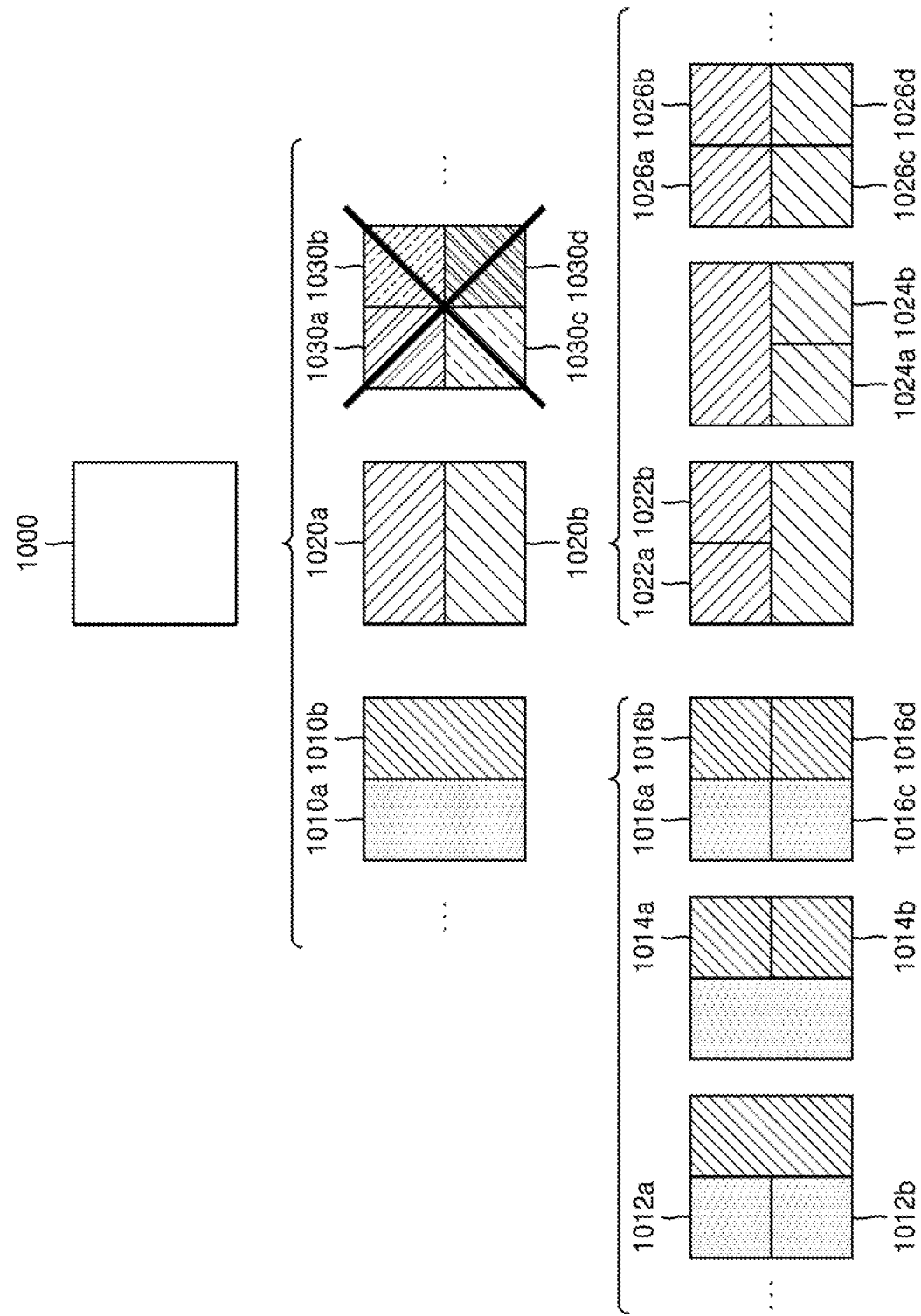
FIG. 10 illustrates a process of splitting a square coding unit when split shape information indicates that the square coding unit is not to be split into four square coding units, according to an embodiment.

FIG. 10 illustrates a process, performed by the image decoding apparatus 150, of splitting a square coding unit when split shape information indicates that the square coding unit is not to be split into four square coding units, according to an embodiment.

According to an embodiment, the image decoding apparatus 150 may determine second coding units 1010*a*, 1010*b*, 1020*a*, 1020*b*, etc. by splitting a first coding unit 1000, based on at least one of block shape information and split shape information. The split shape information may include information about various methods of splitting a coding unit but, the information about various splitting methods may not include information for splitting a coding unit into four square coding units. According to such split shape information, the image decoding apparatus 150 may not split the square first coding unit 1000 into four square second coding units 1030*a*, 1030*b*, 1030*c*, and 1030*d*. The image decoding apparatus 150 may determine the non-square second coding units 1010*a* and 1010*b* or 1020*a* and 1020*b*, etc., based on the split shape information.

According to an embodiment, the image decoding apparatus 150 may independently split the non-square second coding units 1010*a* and 1010*b* or 1020*a* and 1020*b*, etc. Each of the second coding units 1010*a*, 1010*b*, 1020*a*, 1020*b*, etc. may be recursively split in a predetermined order, and this splitting method may correspond to a method of splitting the first coding unit 1000, based on at least one of the block shape information and the split shape information.

For example, the image decoding apparatus 150 may determine square third coding units 1012*a* and 1012*b* by splitting the left second coding unit 1010*a* in a horizontal direction, and may determine square third coding units 1014*a* and 1014*b* by splitting the right second coding unit 1010*b* in a horizontal direction. Furthermore, the image decoding apparatus 150 may determine square third coding units 1016*a*, 1016*b*, 1016*c*, and 1016*d* by splitting both of the left and right second coding units 1010*a* and 1010*b* in a horizontal direction. In this case, coding units having the same shape as the four square second coding units 1030*a*, 1030*b*, 1030*c*, and 1030*d* split from the first coding unit 1000 may be determined.

As another example, the image decoding apparatus 160 may determine square third coding units 1022*a* and 1022*b* by splitting the upper second coding unit 1020*a* in a vertical direction, and may determine square third coding units 1024*a* and 1024*b* by splitting the lower second coding unit 1020*b* in a vertical direction. Furthermore, the image decoding apparatus 150 may determine square third coding units 1026*a*, 1026*b*, 1026*c*, and 1026*d* by splitting both of the upper and lower second coding units 1020*a* and 1020*b* in a vertical direction. In this case, coding units having the same shape as the four square second coding units 1030*a*, 1030*b*, 1030*c*, and 1030*d* split from the first coding unit 1000 may be determined.

Figure 11:
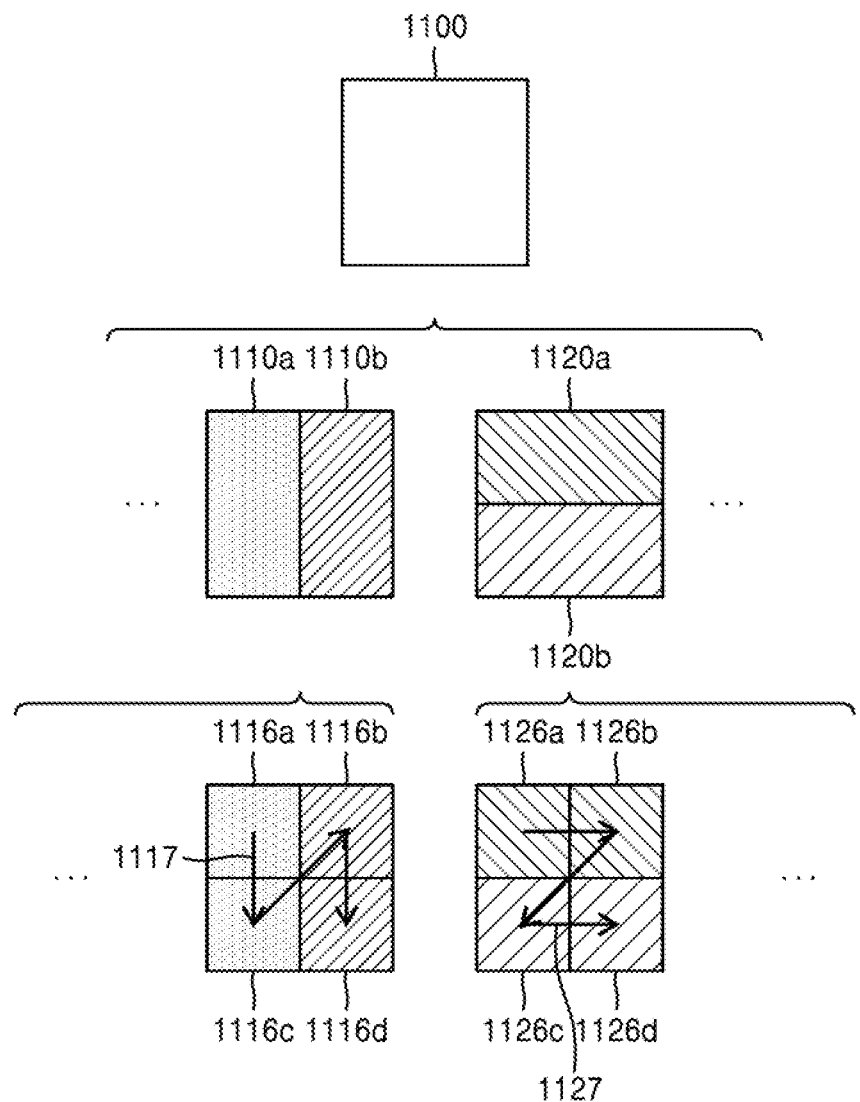
FIG. 11 illustrates that a processing order between a plurality of coding units may be changed depending on a process of splitting a coding unit, according to an embodiment.

FIG. 11 illustrates that a processing order between a plurality of coding units may be changed depending on a process of splitting a coding unit, according to an embodiment.

According to an embodiment, the image decoding apparatus 150 may split a first coding unit 1100, based on block shape information and split shape information. When the block shape information indicates a square shape and the split shape information indicates to split the first coding unit 1100 in at least one of horizontal and vertical directions, the image decoding apparatus 150 may determine second coding units 1110*a*, 1110*b*, 1120*a*, 1120*b* by splitting the first coding unit 1100. Referring to FIG. 11, the non-square second coding units 1110*a*, 1110*b*, 1120*a*, and 1120*b* determined by splitting the first coding unit 1100 in only a horizontal direction or vertical direction may be independently split based on the block shape information and the split shape information of each coding unit. For example, the image decoding apparatus 150 may determine third coding units 1116*a*, 1116*b*, 1116*c*, and 1116*d* by splitting the second coding units 1110*a* and 1110*b*, which are generated by splitting the first coding unit 1100 in a vertical direction, in a horizontal direction, and may determine third coding units 1126*a*, 1126*b*, 1126*c*, and 1126*d* by splitting the second coding units 1120*a* and 1120*b*, which are generated by splitting the first coding unit 1100 in a horizontal direction, in a vertical direction. An operation of splitting the second coding units 1110*a* and 1110*b* or 1120*a* and 1120*b* has been described above in relation to FIG. 9, and thus detailed descriptions thereof will not be provided herein.

According to an embodiment, the image decoding apparatus 150 may process coding units in a predetermined order. An operation of processing coding units in a predetermined order has been described above in relation to FIG. 6, and thus detailed descriptions thereof will not be provided herein. Referring to FIG. 11, the image decoding apparatus 150 may determine four square third coding units 1116*a*, 1116*b*, 1116*c*, and 1116*d*, and 1126*a*, 1126*b*, 1126*c*, and 1126*d* by splitting the square first coding unit 1100. According to an embodiment, the image decoding apparatus 150 may determine processing orders of the third coding units 1116*a*, 1116*b*, 1116*c*, and 1116*d*, and 1126*a*, 1126*b*, 1126*c*, and 1126*d* based on a splitting method of the first coding unit 1100.

According to an embodiment, the image decoding apparatus 150 may determine the third coding units 1116*a*, 1116*b*, 1116*c*, and 1116*d* by splitting the second coding units 1110*a* and 1110*b* generated by splitting the first coding unit 1100 in a vertical direction, in a horizontal direction, and may process the third coding units 1116*a*, 1116*b*, 1116*c*, and 1116*d* in a processing order 1117 for initially processing the third coding units 1116*a* and 1116*c*, which are included in the left second coding unit 1110*a*, in a vertical direction and then processing the third coding unit 1116*b* and 1116*d*, which are included in the right second coding unit 1110*b*, in a vertical direction.

According to an embodiment, the image decoding apparatus 150 may determine the third coding units 1126*a*, 1126*b*, 1126*c*, and 1126*d* by splitting the second coding units 1120*a* and 1120*b* generated by splitting the first coding unit 1100 in a horizontal direction, in a vertical direction, and may process the third coding units 1126*a*, 1126*b*, 1126*c*, and 1126*d* in a processing order 1127 for initially processing the third coding units 1126*a* and 1126*b*, which are included in the upper second coding unit 1120*a*, in a horizontal direction and then processing the third coding unit 1126*c* and 1126*d*, which are included in the lower second coding unit 1120*b*, in a horizontal direction.

Referring to FIG. 11, the square third coding units 1116*a*, 1116*b*, 1116*c*, and 1116*d*, and 1126*a*, 1126*b*, 1126*c*, and 1126*d* may be determined by splitting the second coding units 1110*a* and 1110*b*, and 1120*a* and 1120*b*, respectively. Although the second coding units 1110*a* and 1110*b* are determined by splitting the first coding unit 1100 in a vertical direction differently from the second coding units 1120*a* and 1120*b* which are determined by splitting the first coding unit 1100 in a horizontal direction, the third coding units 1116*a*, 1116*b*, 1116*c*, and 1116*d*, and 1126*a*, 1126*b*, 1126*c*, and 1126*d* split therefrom eventually show same-shaped coding units split from the first coding unit 1100. As such, by recursively splitting a coding unit in different manners based on at least one of the block shape information and the split shape information, the image decoding apparatus 150 may process a plurality of coding units in different orders even when the coding units are eventually determined to be the same shape.

FIG. 12 illustrates a process of determining a depth of a coding unit as a shape and size of the coding unit change, when the coding unit is recursively split such that a plurality of coding units are determined, according to an embodiment.

According to an embodiment, the image decoding apparatus 150 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 150 may determine that a depth of the current coding unit is increased from a depth of the coding unit before being split, by n. In the following description, a coding unit having an increased depth is expressed as a coding unit of a deeper depth.

Referring to FIG. 12, according to an embodiment, the image decoding apparatus 150 may determine a second coding unit 1202 and a third coding unit 1204 of deeper depths by splitting a square first coding unit 1200 based on block shape information indicating a square shape (for example, the block shape information may be expressed as '0: SQUARE'). Assuming that the size of the square first coding unit 1200 is 2N×2N, the second coding unit 1202 determined by splitting a width and height of the first coding unit 1200 to ½ may have a size of N×N. Furthermore, the third coding unit 1204 determined by splitting a width and height of the second coding unit 1202 to ½ may have a size of N/2×N/2. In this case, a width and height of the third coding unit 1204 are ¼ times those of the first coding unit 1200. When a depth of the first coding unit 1200 is D, a depth of the second coding unit 1202, the width and height of which are ½ times those of the first coding unit 1200, may be D+1, and a depth of the third coding unit 1204, the width and height of which are ¼ times those of the first coding unit 1200, may be D+2.

According to an embodiment, the image decoding apparatus 150 may determine a second coding unit 1212 or 1222 and a third coding unit 1214 or 1224 of deeper depths by splitting a non-square first coding unit 1210 or 1220 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 150 may determine a second coding unit 1202, 1212, or 1222 by splitting at least one of a width and height of the first coding unit 1210 having a size of N×2N. That is, the image decoding apparatus 150 may determine the second coding unit 1202 having a size of N×N or the second coding unit 1222 having a size of N×N/2 by splitting the first coding unit 1210 in a horizontal direction, or may determine the second coding unit 1212 having a size of N/2×N by splitting the first coding unit 1210 in horizontal and vertical directions.

According to an embodiment, the image decoding apparatus 150 may determine the second coding unit 1202, 1212, or 1222 by splitting at least one of a width and height of the first coding unit 1220 having a size of 2N×N. That is, the image decoding apparatus 150 may determine the second coding unit 1202 having a size of N×N or the second coding unit 1212 having a size of N/2×N by splitting the first coding unit 1220 in a vertical direction, or may determine the second coding unit 1222 having a size of N×N/2 by splitting the first coding unit 1220 in horizontal and vertical directions.

According to an embodiment, the image decoding apparatus 150 may determine a third coding unit 1204, 1214, or 1224 by splitting at least one of a width and height of the second coding unit 1202 having a size of N×N. That is, the image decoding apparatus 150 may determine the third coding unit 1204 having a size of N/2×N/2, the third coding unit 1214 having a size of N/4×N/2, or the third coding unit 1224 having a size of N/2×N/4 by splitting the second coding unit 1202 in vertical and horizontal directions.

According to an embodiment, the image decoding apparatus 150 may determine a third coding unit 1204, 1214, or 1224 by splitting at least one of a width and height of the second coding unit 1212 having a size of N/2×N. That is, the image decoding apparatus 150 may determine the third coding unit 1204 having a size of N/2×N/2 or the third coding unit 1224 having a size of N/2×N/2 by splitting the second coding unit 1212 in a horizontal direction, or may determine the third coding unit 1214 having a size of N/2×N/2 by splitting the second coding unit 1212 in vertical and horizontal directions.

According to an embodiment, the image decoding apparatus 150 may determine a third coding unit 1204, 1214, or 1224 by splitting at least one of a width and height of the second coding unit 1214 having a size of N×N/2. That is, the image decoding apparatus 150 may determine the third coding unit 1204 having a size of N/2×N/2 or the third coding unit 1214 having a size of N/2×N/2 by splitting the second coding unit 1212 in a vertical direction, or may determine the third coding unit 1224 having a size of N/2×N/2 by splitting the second coding unit 1212 in vertical and horizontal directions.

According to an embodiment, the image decoding apparatus 150 may split the square coding unit 1200, 1202, or 1204 in a horizontal or vertical direction. For example, the image decoding apparatus 150 may determine the first coding unit 1210 having a size of N×2N by splitting the first coding unit 1200 having a size of 2N×2N in a vertical direction, or may determine the first coding unit 1220 having a size of 2N×N by splitting the first coding unit 1200 in a horizontal direction. According to an embodiment, when a depth is determined based on the length of the longest side of a coding unit, a depth of a coding unit determined by splitting the first coding unit 1200, 1202 or 1204 having a size of 2N×2N in a horizontal or vertical direction may be the same as the depth of the first coding unit 1200, 1202 or 1204.

According to an embodiment, a width and height of the third coding unit 1214 or 1224 may be ½ times those of the first coding unit 1210 or 1220. When a depth of the first coding unit 1210 or 1220 is D, a depth of the second coding unit 1212 or 1214, the width and height of which are ½ times those of the first coding unit 1210 or 1220, may be D+1, and a depth of the third coding unit 1214 or 1224, the width and height of which are ½ times those of the first coding unit 1210 or 1220, may be D+2.

Figure 13:
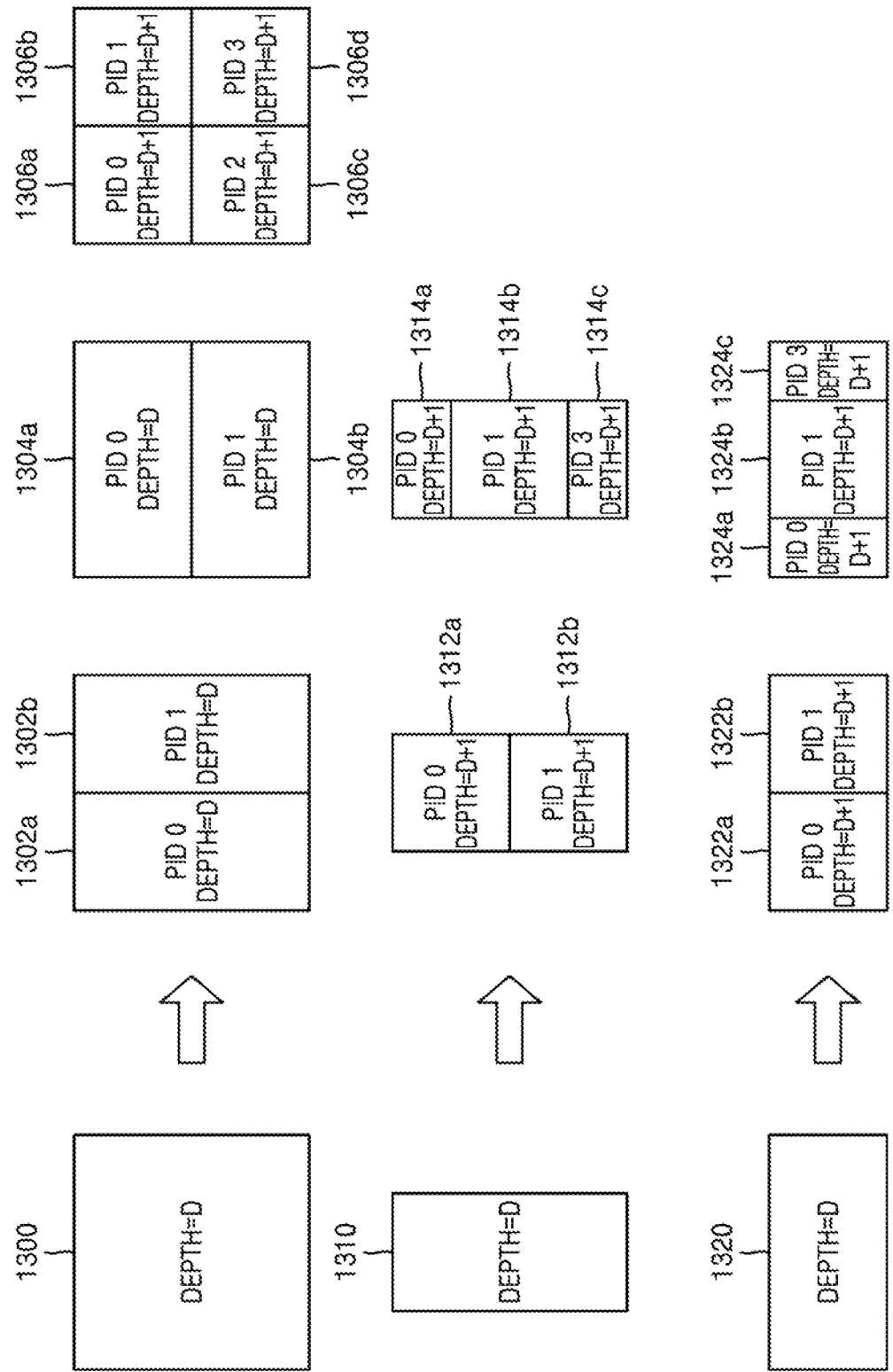
FIG. 13 illustrates depths that are determinable based on shapes and sizes of coding units, and part indexes (PIDs) that are for distinguishing the coding units, according to an embodiment.

FIG. 13 illustrates depths that are determinable based on shapes and sizes of coding units, and part indexes (PIDs) that are for distinguishing the coding units, according to an embodiment.

According to an embodiment, the image decoding apparatus 150 may determine various-shape second coding units by splitting a square first coding unit 1300. Referring to FIG. 13, the image decoding apparatus 150 may determine second coding units 1302a and 1302b, 1304a and 1304b, and 1306a, 1306b, 1306c, and 1306d by splitting the first coding unit 1300 in at least one of vertical and horizontal directions based on split shape information. That is, the image decoding apparatus 150 may determine the second coding units 1302a and 1302b, 1304a and 1304b, and 1306a, 1306b, 1306c, and 1306d, based on the split shape information of the first coding unit 1300.

According to an embodiment, a depth of the second coding units 1302a and 1302b, 1304a and 1304b, and 1306a, 1306b, 1306c, and 1306d, which are determined based on the split shape information of the square first coding unit 1300, may be determined based on the length of a long side thereof. For example, because the length of a side of the square first coding unit 1300 equals the length of a long side of the non-square second coding units 1302a and 1302b, and 1304a and 1304b, the first coding unit 1300 and the non-square second coding units 1302a and 1302b, and 1304a and 1304b may have the same depth, e.g., D. However, when the image decoding apparatus 150 splits the first coding unit 1300 into the four square second coding units 1306a, 1306b, 1306c, and 1306d based on the split shape information, because the length of a side of the square second coding units 1306a, 1306b, 1306c, and 1306d is ½ times the length of a side of the first coding unit 1300, a depth of the second coding units 1306a, 1306b, 1306c, and 1306d may be D+1 which is deeper than the depth D of the first coding unit 1300 by 1.

According to an embodiment, the image decoding apparatus 150 may determine a plurality of second coding units 1312a and 1312b, and 1314a, 1314b, and 1314c by splitting a first coding unit 1310, a height of which is longer than a width, in a horizontal direction based on the split shape information. According to an embodiment, the image decoding apparatus 150 may determine a plurality of second coding units 1322a and 1322b, and 1324a, 1324b, and 1324c by splitting a first coding unit 1320, a width of which is longer than a height, in a vertical direction based on the split shape information.

According to an embodiment, a depth of the second coding units 1312a, 1312b, 1314a, 1314b, 1314c, 1322a, 1322b, 1324a, 1324b, and 1324c, which are determined based on the split shape information of the non-square first coding unit 1310 or 1320, may be determined based on the length of a long side thereof. For example, because the length of a side of the square second coding units 1312a and 1312b is ½ times the length of a height of the first coding unit 1310 having a non-square shape, a depth of the square second coding units 1312a and 1312b is D+1 which is deeper than the depth D of the non-square first coding unit 1310 by 1.

Furthermore, the image decoding apparatus 150 may split the non-square first coding unit 1310 into an odd number of second coding units 1314a, 1314b, and 1314c based on the split shape information. The odd number of second coding units 1314a, 1314b, and 1314c may include the non-square second coding units 1314a and 1314c and the square second coding unit 1314b. In this case, because the length of a long side of the non-square second coding units 1314a and 1314c and the length of a side of the square second coding unit 1314b are ½ times the length of a long side of the first coding unit 1310, a depth of the second coding units 1314a, 1314b, and 1314c may be D+1 which is deeper than the depth D of the non-square first coding unit 1310 by 1. The image decoding apparatus 150 may determine depths of coding units split from the first coding unit 1320 having a non-square shape, a width of which is longer than a height, by using the above-described method of determining depths of coding units split from the first coding unit 1310.

According to an embodiment, the image decoding apparatus 150 may determine PIDs for identifying split coding units, based on a size ratio between the coding units when an odd number of split coding units do not have equal sizes. Referring to FIG. 13, the coding unit 1314b of a center location among the odd number of split coding units 1314a, 1314b, and 1314c may have a width equal to that of the other coding units 1314a and 1314c and a height which is two times that of the other coding units 1314a and 1314c. That is, in this case, the coding unit 1314b at the center location may include two of the other coding unit 1314a or 1314c. Therefore, when a PID of the coding unit 1314b at the center location is 1 based on a scan order, a PID of the coding unit 1314c located next to the coding unit 1314b may be increased by 2 and thus may be 3. That is, discontinuity in PID values may be present. According to an embodiment, the image decoding apparatus 150 may determine whether an odd number of split coding units do not have equal sizes, based on whether discontinuity is present in PIDs for identifying the split coding units.

According to an embodiment, the image decoding apparatus 150 may determine whether to use a specific splitting method, based on PID values for identifying a plurality of coding units determined by splitting a current coding unit. Referring to FIG. 13, the image decoding apparatus 150 may determine an even number of coding units 1312a and 1312b or an odd number of coding units 1314a, 1314b, and 1314c by splitting the first coding unit 1310 having a rectangular shape, a height of which is longer than a width. The image decoding apparatus 150 may use PIDs to identify respective coding units. According to an embodiment, the PID may be obtained from a sample of a predetermined location of each coding unit (e.g., an upper left sample).

According to an embodiment, the image decoding apparatus 150 may determine a coding unit at a predetermined location from among the split coding units, by using the PIDs for distinguishing the coding units. According to an embodiment, when the split shape information of the first coding unit 1310 having a rectangular shape, a height of which is longer than a width, indicates to split a coding unit into three coding units, the image decoding apparatus 150 may split the first coding unit 1310 into three coding units 1314a, 1314b, and 1314c. The image decoding apparatus 150 may assign a PID to each of the three coding units 1314a, 1314b, and 1314c. The image decoding apparatus 150 may compare PIDs of an odd number of split coding units to determine a coding unit at a center location from among the coding units. The image decoding apparatus 150 may determine the coding unit 1314b having a PID corresponding to a middle value among the PIDs of the coding units, as the coding unit at the center location from among the coding units determined by splitting the first coding unit 1310. According to an embodiment, the image decoding apparatus 150 may determine PIDs for distinguishing split coding units, based on a size ratio between the coding units when the split coding units do not have equal sizes. Referring to FIG. 13, the coding unit 1314b generated by splitting the first coding unit 1310 may have a width equal to that of the other coding units 1314a and 1314c and a height which is two times that of the other coding units 1314a and 1314c. In this case, when the PID of the coding unit 1314b at the center location is 1, the PID of the coding unit 1314c located next to the coding unit 1314b may be increased by 2 and thus may be 3. When the PID is not uniformly increased as described above, the image decoding apparatus 150 may determine that a coding unit is split into a plurality of coding units including a coding unit having a size different from that of the other coding units. According to an embodiment, when the split shape information indicates to split a coding unit into an odd number of coding units, the image decoding apparatus 150 may split a current coding unit in such a manner that a coding unit of a predetermined location among an odd number of coding units (e.g., a coding unit of a centre location) has a size different from that of the other coding units. In this case, the image decoding apparatus 150 may determine the coding unit of the centre location, which has a different size, by using PIDs of the coding units. However, the PIDs and the size or location of the coding unit of the predetermined location are not limited to the above-described examples, and various PI Ds and various locations and sizes of coding units may be used.

According to an embodiment, the image decoding apparatus 150 may use a predetermined data unit where a coding unit starts to be recursively split.

Figure 14:
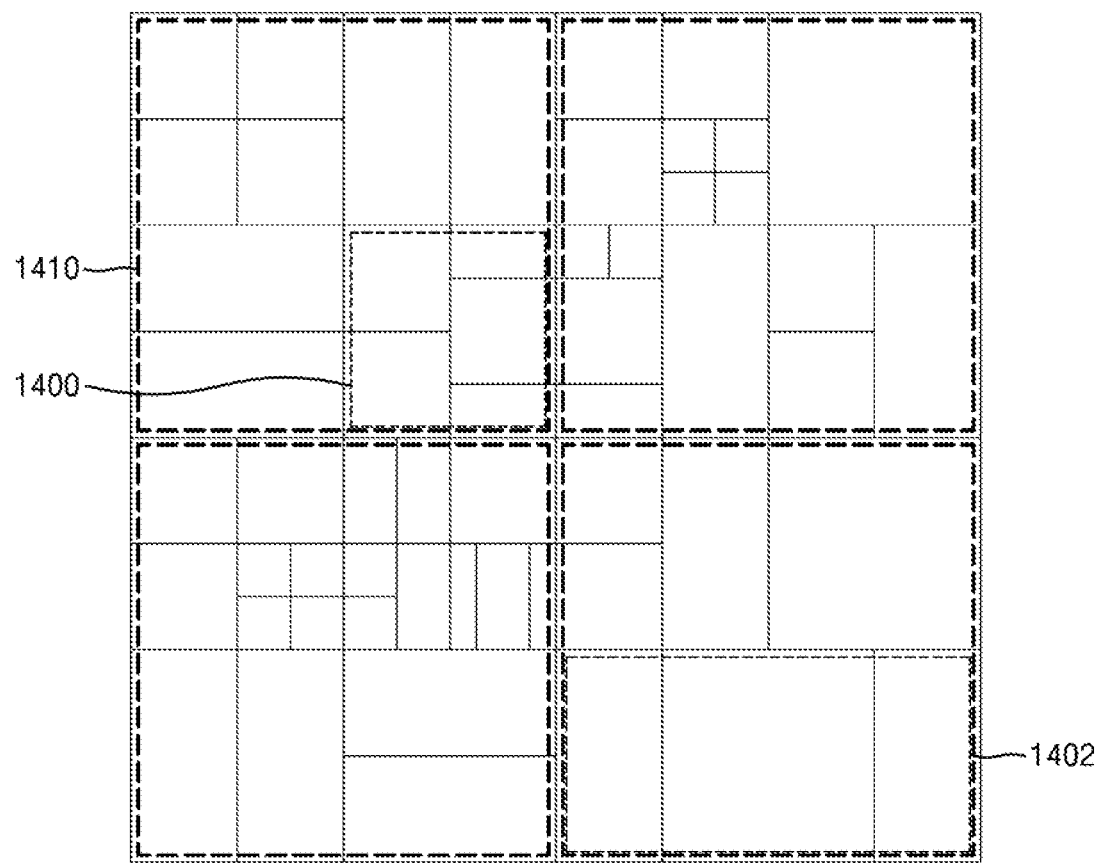
FIG. 14 illustrates that a plurality of coding units are determined based on a plurality of predetermined data units included in a picture, according to an embodiment.

FIG. 14 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 150 may split the current picture into a plurality of reference data units. According to an embodiment, the image decoding apparatus 150 may split the plurality of reference data units, which are split from the current picture, by using splitting information about each reference data unit. The operation of splitting the reference data unit may correspond to a splitting operation using a quadtree structure.

According to an embodiment, the image decoding apparatus 150 may previously determine the minimum size allowed for the reference data units included in the current picture. Accordingly, the image decoding apparatus 150 may determine various reference data units having sizes equal to or greater than the minimum size, and may determine one or more coding units by using the block shape information and the split shape information with reference to the determined reference data unit.

Referring to FIG. 14, the image decoding apparatus 150 may use a square reference coding unit 1400 or a non-square reference coding unit 1402. According to an embodiment, the shape and size of reference coding units may be determined based on various data units capable of including one or more reference coding units (e.g., sequences, pictures, slices, slice segments, largest coding units, or the like).

According to an embodiment, the receiver 160 of the image decoding apparatus 150 may obtain, from a bitstream, at least one of reference coding unit shape information and reference coding unit size information with respect to each of the various data units. An operation of splitting the square reference coding unit 1400 into one or more coding units has been described above in relation to the operation of splitting the current coding unit 200 of FIG. 2, and an operation of splitting the non-square reference coding unit 1402 into one or more coding units has been described above in relation to the operation of splitting the current coding unit 300 or 350 of FIG. 3. Thus, detailed descriptions thereof will not be provided herein.

According to an embodiment, the image decoding apparatus 150 may use a PID for identifying the size and shape of reference coding units, to determine the size and shape of reference coding units according to some data units previously determined based on a predetermined condition. That is, the receiver 160 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 150 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 150 may determine at least one of the size and shape of reference coding units included in a data unit serving as a unit for obtaining the PID, by selecting the previously determined at least one of the size and shape of reference coding units based on the PID.

According to an embodiment, the image decoding apparatus 150 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 150 may determine the reference coding units by splitting the largest coding unit n times based on a quadtree structure, and may split the reference coding unit based on at least one of the block shape information and the split shape information according to various embodiments.

Figure 15:
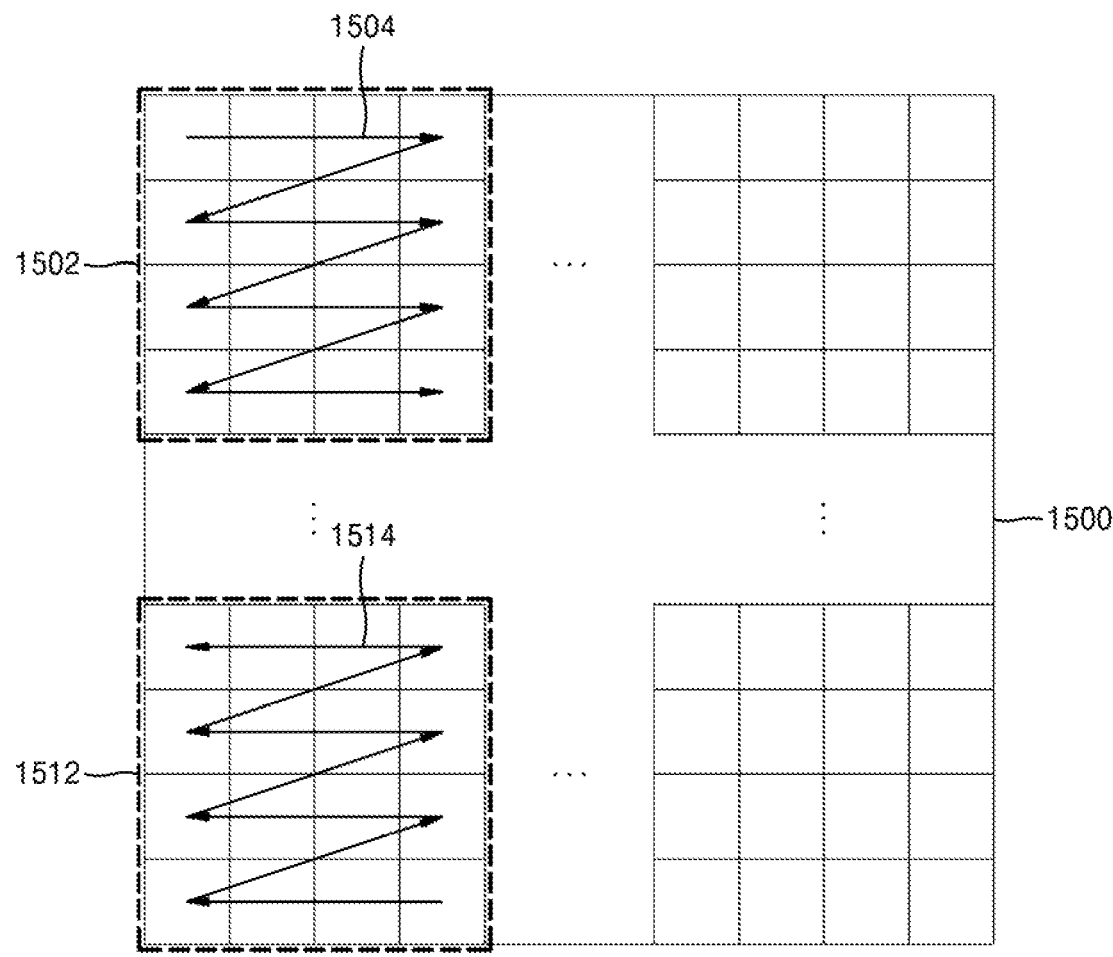
FIG. 15 illustrates a processing block serving as a criterion for determining a determination order of reference coding units included in a picture, according to an embodiment.

FIG. 15 illustrates a processing block serving as a criterion for determining a determination order of reference coding units included in a picture 1500, according to an embodiment.

According to an embodiment, the image decoding apparatus 150 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 150 may obtain processing block size information and may determine the size of one or more processing blocks included in the picture. The image decoding apparatus 150 may obtain the processing block size information from a bitstream and may determine the size of one or more processing blocks included in the picture. The size of processing blocks may be a predetermined size of data units, which is indicated by the processing block size information.

According to an embodiment, the receiver 160 of the image decoding apparatus 150 may obtain the processing block size information from the bitstream according to each specific data unit. For example, the processing block size information may be obtained from the bitstream in a data unit such as an image, sequence, picture, slice, or slice segment. That is, the receiver 160 may obtain the processing block size information from the bitstream according to each of the various data units, and the image decoding apparatus 150 may determine the size of one or more processing blocks, which are split from the picture, by using the obtained processing block size information. The size of the processing blocks may be integer times that of the reference coding units.

According to an embodiment, the image decoding apparatus 150 may determine the size of processing blocks 1502 and 1512 included in the picture 1500. For example, the image decoding apparatus 150 may determine the size of processing blocks based on the processing block size information obtained from the bitstream. Referring to FIG. 15, according to an embodiment, the image decoding apparatus 150 may determine a width of the processing blocks 1502 and 1512 to be four times the width of the reference coding units, and may determine a height of the processing blocks 1502 and 1512 to be four times the height of the reference coding units. The image decoding apparatus 150 may determine a determination order of one or more reference coding units in one or more processing blocks.

According to an embodiment, the image decoding apparatus 150 may determine the processing blocks 1502 and 1512, which are included in the picture 1500, based on the size of processing blocks, and may determine a determination order of one or more reference coding units in the processing blocks 1502 and 1512. According to an embodiment, determination of reference coding units may include determination of the size of the reference coding units.

According to an embodiment, the image decoding apparatus 150 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 150 may obtain, from the bitstream, the determination order information of reference coding units according to each specific data unit. For example, the receiver 160 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 150 may determine one or more reference coding units based on the determined determination order.

According to an embodiment, the receiver 160 may obtain the determination order information of reference coding units from the bitstream as information related to the processing blocks 1502 and 1512, and the image decoding apparatus 150 may determine a determination order of one or more reference coding units included in the processing blocks 1502 and 1512 and determine one or more reference coding units, which are included in the picture 1500, based on the determination order. Referring to FIG. 15, the image decoding apparatus 150 may determine determination orders 1504 and 1514 of one or more reference coding units in the processing blocks 1502 and 1512, respectively. For example, when the determination order information of reference coding units is obtained with respect to each processing block, different types of the determination order information of reference coding units may be obtained for the processing blocks 1502 and 1512. When the determination order 1504 of reference coding units in the processing block 1502 is a raster scan order, reference coding units included in the processing block 1502 may be determined according to a raster scan order. On the contrary, when the determination order 1514 of reference coding units in the other processing block 1512 is a backward raster scan order, reference coding units included in the processing block 1512 may be determined according to the backward raster scan order. Methods of splitting an image into a largest coding unit and splitting the largest coding unit into coding units of a hierarchical tree structure have been described above with reference to FIGS. 1 to 15. A method of applying a deblocking filter to a decoded coding unit will be described with reference to FIGS. 16 to 24 below.

When an image is encoded in units of blocks by transformation and quantization, discontinuity occurs between pixels at a block boundary of a decoded image. Deterioration due to the discontinuity between the pixels at the block boundary is referred to as blocking artifact. As a quantization degree increases, loss of image data increases and thus blocking artifact also increases. Therefore, a deblocking filter is used to mitigate the discontinuity between the pixels at the block boundary.

Whether to apply a deblocking filter is determined in consideration of a block size, a method of encoding a block, and pixel values of the pixels at the block boundary. A deblocking filter to be used for the block boundary may be selected according to a degree of blocking artifact. A method of applying a deblocking filter to blocks of a decoded picture will be described below.

Figure 16:
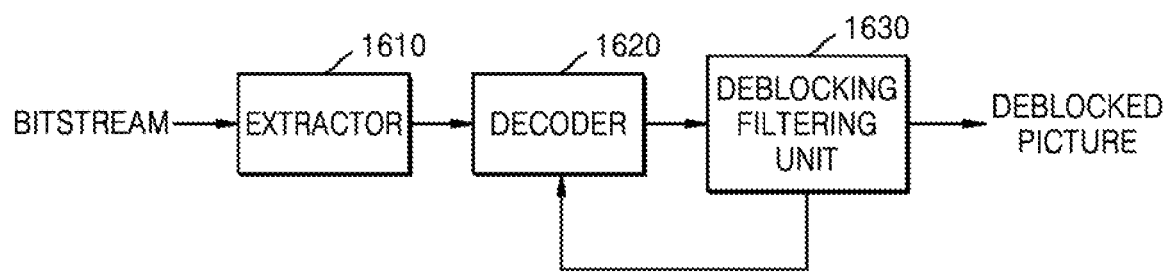
FIG. 16 is a block diagram of a video decoding apparatus which performs deblocking filtering based on coding units according to a tree structure.

FIG. 16 is a block diagram of a video decoding apparatus which performs deblocking filtering based on coding units according to a tree structure.

A video decoding apparatus 1600 includes an extractor 1610, a decoder 1620, and a deblocking filtering unit 1630. In FIG. 16, the extractor 1610, the decoder 1620, and the deblocking filtering unit 1630 are illustrated as separate components but may be combined as one component in one embodiment.

In FIG. 16, the extractor 1610, the decoder 1620, and the deblocking filtering unit 1630 are illustrated as components located in one device but devices functioning as the extractor 1610, the decoder 1620, and the deblocking filtering unit 1630 are not necessarily physically contiguous. Therefore, according to one embodiment, the extractor 1610, the decoder 1620, and the deblocking filtering unit 1630 may be dispersed.

In one embodiment, the extractor 1610, the decoder 1620, and the deblocking filtering unit 1630 may be embodied as one processor. In one embodiment, the extractor 1610, the decoder 1620, and the deblocking filtering unit 1630 may be embodied as a plurality of processors.

The extractor 1610 may receive and parse a bitstream to extract image data encoded in units of coding units of a tree structure, coding mode information for the coding units of the tree structure, and information about deblocking filtering with respect to each largest coding unit. The extractor 1610 may extract the information about deblocking filtering from a sequence header or a picture header.

The decoder 1620 decodes the image data encoded in units of the coding units, based on the coding mode information, for the coding units of the tree structure, which is extracted by the extractor 1610.

The decoder 1620 may determine a split type, a prediction mode, and the like of a coding unit, based on information about the coding units of the tree structure for each largest coding unit. For example, the decoder 1620 may determine a split type and a prediction mode of a coding unit according to split type information and prediction mode information.

The decoder 1620 may decode encoded image data of a largest coding unit by decoding the encoded image data, based on a partition type, prediction mode, and a transformation unit for each coding unit included in the largest coding unit.

The image data decoded by the decoder 1620 and the information about deblocking filtering extracted by the extractor 1610 are input to the deblocking filtering unit 1630 according to an embodiment.

The deblocking filtering unit 1630 may determine a block boundary at which deblocking filtering is to be performed from block boundaries determined by coding units, based on the information about deblocking filtering. A method of determining a block boundary at which deblocking filtering is to be performed by the deblocking filtering unit 1630 will be described with reference to FIGS. 17A to 17D below.

FIGS. 17A to 17D illustrate deblocking filtering boundaries of blocks of a tree structure determined by splitting largest coding units.

Figure 17A:
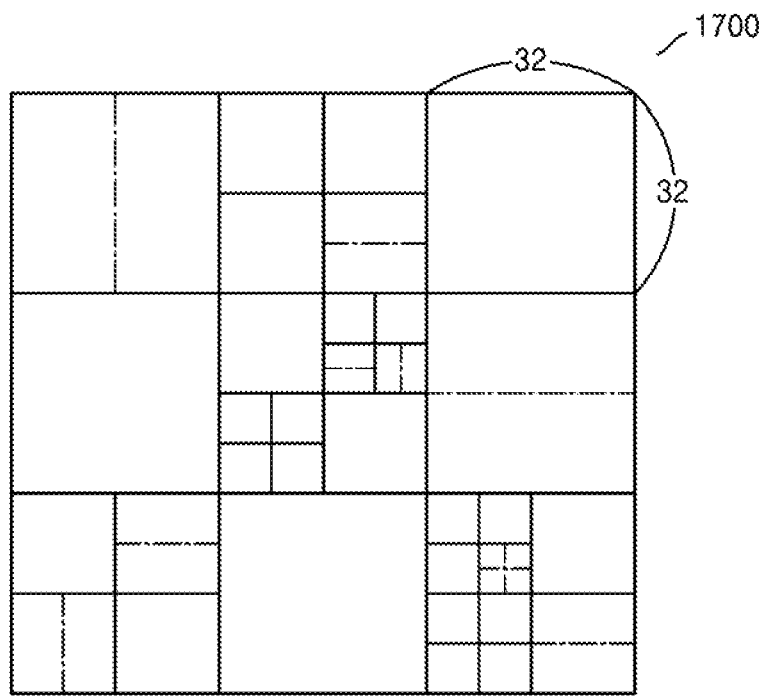
FIGS. 17A to 17D illustrate deblocking filtering boundaries of blocks according to a tree structure determined by splitting largest coding units.

Referring to FIG. 17A, a data unit group 1700 includes nine coding units having a size of 32×32. Each of the coding unit includes blocks according to a tree structure. The deblocking filtering unit 1630 determines a filtering boundary at which deblocking filtering is to be performed, based on blocks as illustrated in FIG. 17A.

Specifically, the deblocking filtering unit 1630 may determine a filtering boundary, based on a boundary of blocks having a certain size or more among the blocks. In other words, referring to FIG. 17A, when a current picture is split into various-sized blocks having a hierarchical structure, only a boundary of coding units having a certain size or more among boundaries of the blocks may be determined as boundaries at which deblocking filtering is to be performed.

Figure 17B:
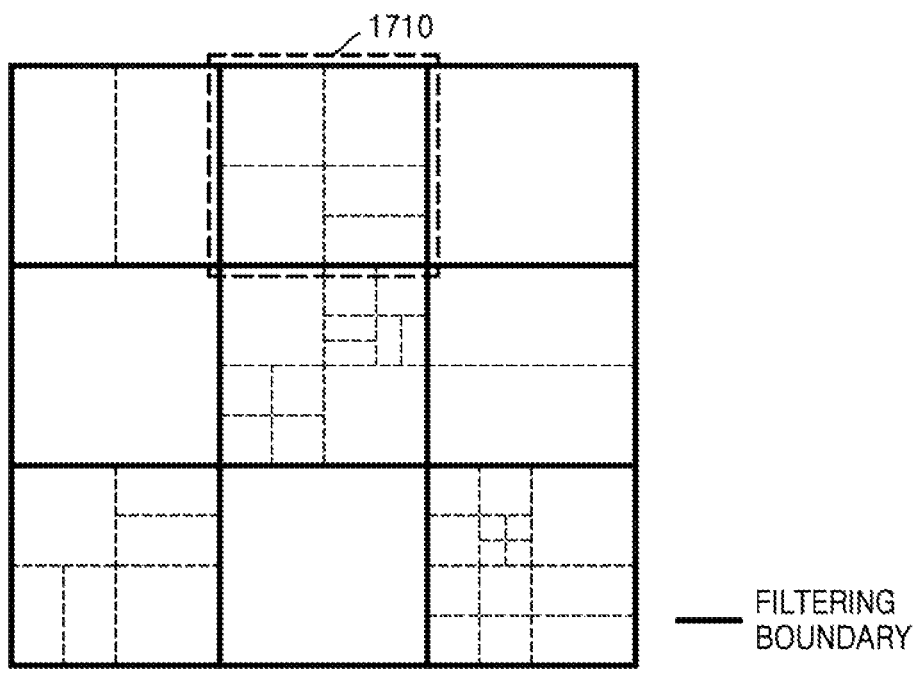
Figure 17C:
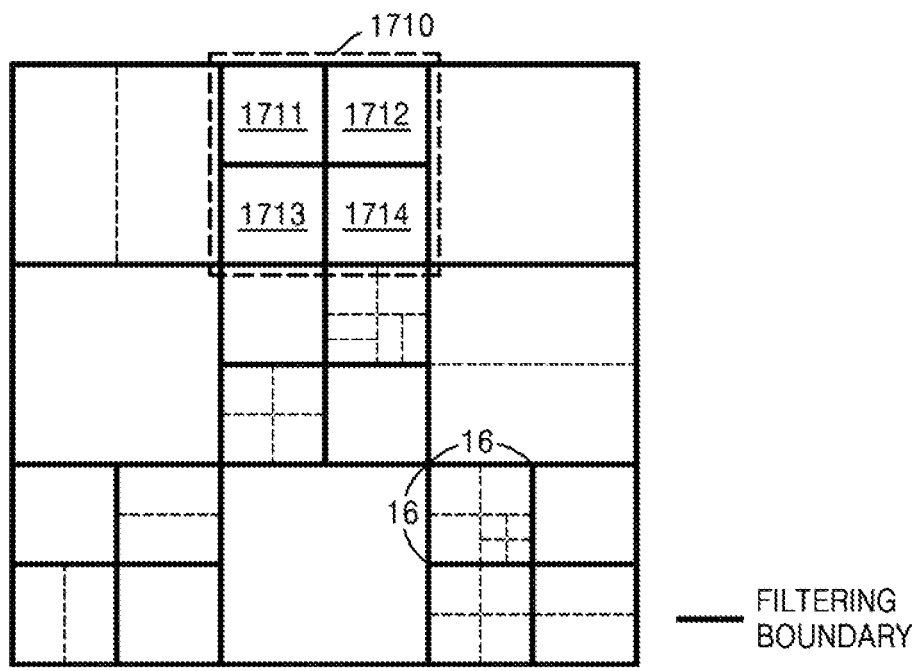
Figure 17D:
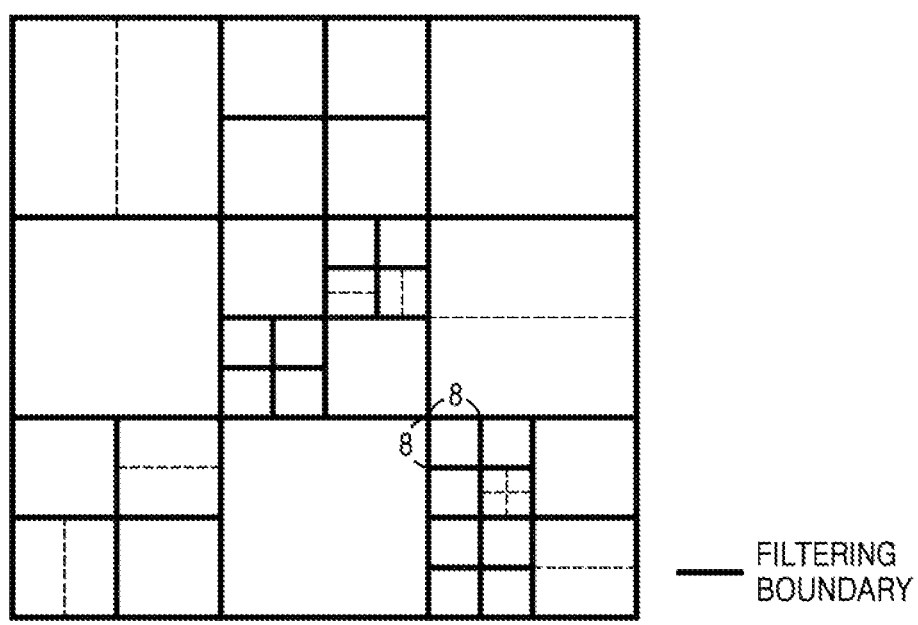

For example, as illustrated in FIG. 17B, the deblocking filtering unit 1630 may determine a boundary of blocks having a size of 32×32 or more as a filtering boundary at which deblocking filtering is to be performed. Alternatively, the deblocking filtering unit 1630 may determine a boundary of blocks having a size of 16×16 or more as a filtering boundary at which deblocking filtering is to be performed, as illustrated in FIG. 17C. Similarly, the deblocking filtering unit 1630 may determine a boundary of blocks having a size of 8×8 or more as a filtering boundary at which deblocking filtering is to be performed, as illustrated in FIG. 17D.

As described above, when only a boundary of a block having a certain size or more is determined as a filtering boundary at which deblocking filtering is to be performed, a filtering boundary at which filtering is to be performed is changed even for the same split type. For example, as illustrated in FIG. 17B, when it is assumed that deblocking filtering is performed at a boundary of a block having a size of 32×32 or more, an inner boundary is not considered as a filtering boundary, except for a boundary overlapping the coding unit 1710 having the size of 32×32 among boundaries of blocks of a coding unit 1710 having a size of 32×32. However, as illustrated in FIG. 17C, when deblocking filtering is performed on a boundary of a block having a size of 16×16 or more, the internal boundary of blocks 1711 to 1714 of the coding unit 1710 may also be determined as a filtering boundary.

When a boundary of a block having a certain size or more overlaps a boundary of a picture, the deblocking filtering unit 1630 may not determine the boundary of the block having the certain size or more as a filtering boundary. That is, deblocking filtering according to an embodiment of the present disclosure may be not performed on the boundary of the picture.

The deblocking filtering unit 1630 determines whether to apply a deblocking filter to neighboring pixels according to encoding information of a current block, encoding information of a neighboring block and pixel values of pixels adjacent to a boundary of the current block. Whether to apply a deblocking filter by the deblocking filtering unit 1630 will be described based on FIGS. 18A and 18B below.

FIG. 18A illustrates pixels adjacent to a vertical boundary 1830 between blocks. For convenience of explanation, pixels of a region 1810 to the left of the vertical boundary 1830 are assigned reference numbers with respect to an upper right pixel as the origin. Similarly, for convenience of explanation, pixels of a region 1820 to the right of the vertical boundary 1830 are assigned reference numbers with respect to an upper left pixel as the origin.

FIG. 18B illustrates pixels adjacent to a horizontal boundary 1880 between blocks. Pixels of a region 1860 above the horizontal boundary 1880 are assigned reference numbers with respect to a lower left pixel as the origin for convenience of explanation. Similarly, for convenience of explanation, pixels of a region 1870 below the horizontal boundary 1880 are assigned reference numbers with respect to an upper left pixel as the origin.

The deblocking filtering unit 1630 may determine whether to apply a deblocking filter in units of four rows or four columns of a filtering boundary, and select a deblocking filter. Therefore, even when deblocking filtering is performed on pixels adjacent to a boundary of a 16×16 block, it is possible to determine whether to apply a deblocking filter in units of four rows or four columns and to select a deblocking filter. In one embodiment, whether to apply a deblocking filter may be determined and a deblocking filter may be selected in units of eight rows or eight columns.

For example, according to FIG. 18A, when it is determined whether to apply a deblocking filter for every four rows, the deblocking filtering unit 1630 may determine whether to apply a deblocking filter to pixels in a first row to a fourth row and select a deblocking filter. In addition, the deblocking filtering unit 1630 may determine whether to apply a deblocking filter to pixels in a fifth row to an eighth row independently of the pixels in the first row to fourth row, and select a deblocking filter. Therefore, the deblocking filter may be applied to pixels in the first to fourth rows and may not be applied to the pixels in the fifth to eighth rows. When it is determined whether to apply a deblocking filter for every eight rows, the deblocking filtering unit 1630 may determine whether to apply a deblocking filter to the pixels in the first to eighth rows, and select a deblocking filter.

Similarly, in the case of FIG. 18B, when it is determined whether to apply a deblocking filter for every four columns, it may be determined whether to apply a deblocking filter to pixels in the first to fourth columns. When it is determined whether to apply a deblocking filter for each eight columns, it may be determined whether to apply the deblocking filter to the pixels in the first to eighth columns.

A function of the deblocking filtering unit 1630 will be described below under an assumption that whether to apply a deblocking filter is determined for every four rows or four columns.

The deblocking filtering unit 1630 may determine whether to apply a deblocking filter to neighboring pixels according to whether at least one of a current block or a neighboring block has been intra-predicted. Even when only one of the current block and the neighboring block has been intra-predicted, pixels at a boundary of the two blocks are likely to be discontinuous and thus a deblocking filter may be applied to improve continuity between the pixels.

For example, in FIG. 18A, the deblocking filtering unit 1630 determines whether at least one of a square block 1840 including a p0,0 pixel in a first row or a square block 1845 including a q0,0 pixel in a first row has been intra-predicted. In addition, even when one of the blocks 1840, 1845 has been intra-predicted, the deblocking filtering unit 1630 may determine a deblocking filter to be applied to pixels in the first to fourth rows. Similarly, in FIG. 18B, the deblocking filtering unit 1630 may determine to apply a deblocking filter to pixels in the first to fourth columns when at least one of a square block 1890 including a p0,0 pixel in the first column or a square block 1895 including a q0,0 pixel in the first column has been intra-predicted.

When the current block and the neighboring block have been inter-predicted, the deblocking filtering unit 1630 may determine whether to apply a deblocking filter to the neighboring pixels according to the difference in size between a motion vector used for prediction of the current block and a motion vector used for prediction of the neighboring block. When the current block and the neighboring block have been inter-predicted, the deblocking filtering unit 1630 may determine whether to apply a deblocking filter to the neighboring pixels according to whether a reference picture used for prediction of the current block and a reference picture used for prediction of the neighboring block are the same. When the current block and the neighboring block are predicted using the same reference picture and the same motion vector, pixels at the boundary of the two blocks are likely to be continuous. However, when reference pictures referenced by the current block and the neighboring block are different or when the difference between motion vectors of the current block and the neighboring block is large, the pixels at the boundary of the two blocks are likely to be discontinuous and thus the deblocking filter may be applied to improve continuity between the pixels.

For example, in FIG. 18A, the deblocking filtering unit 1630 may compare motion vectors and reference pictures used for the square block 1840 including the p0,0 pixels in the first row and the square block 1845 including the q0,0 pixel. The deblocking filtering unit 1630 may determine to apply a deblocking filter to the pixels in the first to fourth rows when integer values of the motion vectors are different or the reference pictures are different. Similarly, in FIG. 18B, the deblocking filtering unit 1630 may determine to apply a deblocking filter to the pixels in the first to fourth columns when integer values of motion vectors of the square block 1890 including the p0,0 pixel in the first column and the square block 1895 including the q0,0 pixel in the first column are different or when the reference pixels are different.

The deblocking filtering unit 1630 may determine whether to apply a deblocking filter to the neighboring pixels according to whether there is a non-zero transform coefficient in two blocks including pixels at a block boundary. The transform coefficient refer to a coefficient included in a transform block generated by frequency transforming a difference block representing the difference between a predicted block and an original block. When at least one of transform coefficients is not zero, the deblocking filtering unit 1630 may apply a deblocking filter to improve continuity between the pixels because there is a high possibility of an error in prediction of the pixels.

For example, in FIG. 18A, the deblocking filtering unit 1630 may identify whether there is at least one non-zero transform coefficient among transform coefficients of the block 1810 including the p0,0 pixels in the first row and the block 1820 including the q0,0 pixels. The deblocking filtering unit 1630 may apply a deblocking filter to pixels of the 4×4 blocks 1840 and 1845 when at least one non-zero transform coefficient is found. Similarly, in FIG. 18B, when there is at least one non-zero transform coefficient among transform coefficients of a block 1860 including a p0,0 pixel in a first column and a block 1870 including a q0,0 pixel, the deblocking filtering unit 1630 may apply a deblocking filter to pixels of the 4×4 blocks 1890 and 1895.

In one embodiment, when the number of non-zero transform coefficients found from neighboring pixels is greater than or equal to a predetermined number, the deblocking filtering unit 1630 may apply a deblocking filter to the neighboring pixels. In addition, the deblocking filtering unit 1630 may apply the deblocking filter to the neighboring pixels according to the sum of absolute values of transform coefficients of the neighboring pixels.

The deblocking filtering unit 1630 may compare a threshold determined by a quantization parameter of a current block and a quantization parameter of a neighboring block with difference information between neighboring samples to determine whether to apply the deblocking filter to the neighboring pixels.

The difference information may include the difference in pixel values between the neighboring pixels of the current block, the difference in pixel values between neighboring pixels of the neighboring block, and the difference in pixel values between the neighboring pixel of the current block and the neighboring pixel of the neighboring block. Blocking artifact is conspicuous when the changing amount in a pixel value in a block is small and the changing amount in a pixel value at a boundary of the block is high, and thus whether to apply the deblocking filter may be determined using the difference information indicating a change in the pixel values in the block.

In detail, the deblocking filtering unit 1630 may calculate changing amount d of a pixel value in a block and determine whether to apply the deblocking filter to neighboring pixels according to the changing amount d. In addition, the deblocking filtering unit 1630 may compare the changing amount d with a threshold β determined from an average value of the quantization parameter of the current block and the quantization parameter of the neighboring block. Because blocking artifact increases as a quantization parameter increases, the threshold β increases as the average value of the quantization parameters increases. Therefore, whether the changing amount d is small is determined relative to the average value of the quantization parameters.

For example, in FIG. 18A, the deblocking filtering unit 1630 may determine the changing amount d of a pixel value from the pixels included in the square blocks 1840 including the p0,0 pixel in the first row and the square block 1845 including the q0,0 pixel. Similarly, in FIG. 18B, the deblocking filtering unit 1630 may determine the changing amount d of a pixel value from the pixels included in the square blocks 1890 including the p0,0 pixel in the first column and the square block 1895 including the q0,0 pixel.

Equation 1 below represents the changing amount d for determining whether to apply the deblocking filter to neighboring pixels at a vertical boundary.

$$d=\text{abs}(p2,0-2*p1,0+p0,0)+\text{abs}(p2,3-2*p1,3+p0,3)+\text{abs}(q2,0-2*q1,0+q0,0)+\text{abs}(q2,3-2*q1,3+q0,3) \quad \text{[Equation 1]}$$

abs(X) represents an absolute value of X, and p0,0, p1,0, p2,0, p0,3, p1,3, p2,3, q0,0, q1,0, q2,0, q0,3, q1,3, and q2,3 represent pixel values of pixels illustrated in FIG. 18A. Therefore, the sum of abs(p2,0−2*p1,0+p0,0) and abs(q2,0−2*q1,0+q0,0) represents the changing amount in the first row, and the sum of abs(p2,3−2*p1,3+p0,3) and abs(q2,3−2*q1,3+q0,3) represents the changing amount in the fourth row. The changing amount d for determining whether to perform deblocking filtering at the vertical boundary is calculated by adding the changing amount in the first row and the changing amount in the fourth row.

Equation 2 below represents the changing amount d for determining whether to apply the deblocking filter to neighboring pixels at a horizontal boundary.

$$d=\text{abs}(p0,2-2*p0,1+p0,0)+\text{abs}(p3,2-2*p3,1+p3,0)+\text{abs}(q0,2-2*q0,1+q0,0)+\text{abs}(q3,2-2*q3,1+q3,0) \quad \text{[Equation 2]}$$

abs(X) represents an absolute value of X, and p0,0, p0,1, p0,2, p3,0, p3,1, p3,2, q0,0, q0,1, q0,2, q3,0, q3,1, and q3,2 represent pixel values of pixels illustrated in FIG. 18B. Therefore, the sum of abs(p0,2−2*p0,1+p0,0) and abs(p3,2−2*p3,1+p3,0) represents the changing amount in the first column, and the sum of abs(p3,2−2*p3,1+p3,0) and abs(q3,2−2*q3,1+q3,0) represents the changing amount in the fourth column. The changing amount d for determining whether to perform deblocking filtering at the horizontal boundary is calculated by adding the changing amount in the first column and the changing amount in the fourth column. The values used in Equations 1 and 2 may be changed for optimization.

The deblocking filtering unit 1630 may apply a deblocking filter to neighboring pixels when the changing amount d calculated from Equation 1 or 2 is less than the threshold β. Conversely, a deblocking filter may not be applied to the neighboring pixels when the changing amount d calculated from Equation 1 or 2 is greater than the threshold β.

The deblocking filtering unit 1630 may determine whether to apply a deblocking filter to neighboring pixels in consideration of a plurality of conditions disclosed in this specification. When at least one condition causing pixel discontinuity to occur at a block boundary is found from encoding information of the neighboring pixels, the deblocking filtering unit 1630 may apply a deblocking filter to the neighboring pixels. However, when at least one condition causing pixel discontinuity to occur at a block boundary is not found from the encoding information of the neighboring pixels, the deblocking filtering unit 1630 does not apply a deblocking filter to the neighboring pixels.

When a deblocking filter is applied to the neighboring pixels, the deblocking filtering unit 1630 may select a deblocking filter to be applied to the neighboring pixels from among a plurality of deblocking filters according to pixel values of the neighboring pixels. The deblocking filtering unit 1630 may select a deblocking filter for each row with respect to a vertical boundary. Similarly, the deblocking filtering unit 1630 may select a deblocking filter for each column with respect to a horizontal boundary.

The plurality of deblocking filters are classified according to a filtering area to which a deblocking filter is applied. The stronger a deblocking filter, the wider a filtering area, and the weaker the deblocking filter, the narrower the filtering area. The plurality of deblocking filters may include a first deblocking filter, a second deblocking filter, and a third deblocking filter. The first deblocking filter is a filter with a narrowest filtering area. The second deblocking filter has a larger filtering area than that of the first deblocking filter, and the third deblocking filter has a larger filtering area than those of the first deblocking filter and the second deblocking filter. Therefore, the third deblocking filter is a strongest deblocking filter among the first to third deblocking filters. The plurality of deblocking filters may additionally include a deblocking filter stronger than the third deblocking filter.

The deblocking filtering unit 1630 may select a deblocking filter to be applied to neighboring pixels according to the size of the current block or the size of a neighboring block. For a large block, a range of neighboring samples to which deblocking filtering is applied may be increased and thus a stronger deblocking filter may be applied. For example, in the case of an 8×8 block, only pixels within a 4-pixel unit from a boundary of the 8×8 block may be targets to be deblocking-filtered. For example, in the case of a 16×16 block, pixels within an 8-pixel unit from a boundary of the 16×16 block may be also targets to be deblocking-filtered. Therefore, a stronger deblocking filter may be set to be used for large blocks.

The deblocking filtering unit 1630 may select a deblocking filter by using the difference information in determining deblocking filter strength as the difference information is used in determining as to whether a deblocking filter is to be applied as described above. In addition, the deblocking filtering unit 1630 may compare the difference information with a threshold determined by a quantization parameter of a current block and a quantization parameter of a neighboring block to select a deblocking filter to be applied to neighboring pixels. Equations 3 to 5 used to determine difference information will be described based on FIGS. 19A and 19B below.

Equations 3 to 5 below may be considered to select a deblocking filter for neighboring pixels at a vertical boundary.

$$\text{abs}(p2-2*p1+p0)+\text{abs}(q2-2*q1+q0)<\beta/8 \quad \text{[Equation 3]}$$

$$\text{abs}(p3-p0)+\text{abs}(q3-q0)<\beta/8 \quad \text{[Equation 4]}$$

$$\text{abs}(p0-q0)<2.5tc \quad \text{[Equation 5]}$$

In Equations 3 to 5, p0, p1, p2, p3, q0, q1, q2, and q3 represent pixel values of pixels located in the same row or column. For example, in FIG. 19A, p0, p1, p2, p3, q0, q1, q2, and q3 represent pixel values of pixels in the same row. In FIG. 19B, p0, p1, p2, p3, q0, q1, q2, and q3 represent pixel values of pixels located in the same column.

β/8 and tc represent thresholds determined from an average value of the quantization parameter of the current block and the quantization parameter of the neighboring block. The threshold β/8 is a value obtained by dividing a threshold β, which is used to determine whether to apply a deblocking filter to neighboring pixels, by 8. The thresholds β and β/8 are thresholds for the difference between pixels in a block, and the threshold tc is a threshold for the difference between pixels at a boundary of the block.

When the conditions of Equations 3 to 5 are all satisfied, the deblocking filtering unit 1630 may select a strong deblocking filter. Conversely, when any of the conditions of Equations 3 to 5 is not satisfied, the deblocking filtering unit 1630 may select the first deblocking filter.

In one embodiment, some of the conditions of Equations 3 to 5 may not be considered. The values used in Equations 3 to 5 may be changed for optimization.

Additionally, the deblocking filtering unit 1630 may select one of a plurality of deblocking filters in consideration of sizes of blocks and the difference information. For example, the deblocking filtering unit 1630 may select the third deblocking filter when both the size of the current block and the size of the neighboring block are 16×16 and a condition of Equation 6 below is satisfied, and select the second deblocking filter having lower filtering strength than that of the third deblocking filter otherwise.

$$\text{abs}(p7-p0)+\text{abs}(q7-q0)<\beta/8 \quad \text{[Equation 6]}$$

As described above with reference to Equations 3 to 5, p0, p7, q0, and q7 in Equation 6 represent pixel values of pixels located in the same row or column. For example, in FIG. 19A, p0, p7, q0, and q7 represent pixel values of pixels located in the same row. In FIG. 19B, p0, p7, q0, and q7 represent pixel values of pixels located in the same column.

Alternatively, the deblocking filtering unit 1630 may select the third deblocking filter when the size of the current block and the size of the neighboring block are greater than or equal to a certain size. Alternatively, the deblocking filtering unit 1630 may determine whether to apply the third deblocking filter regardless of the size of the current block and the size of the neighboring block.

A plurality of applicable deblocking filters may include a first deblocking filter, a second deblocking filter, and a third deblocking filter. In one embodiment, an additional deblocking filter may be further included in a deblocking filter group. Deblocking filters belonging to the deblocking filter group have different ranges of neighboring samples to which a deblocking filtering is applied. Therefore, a deblocking filter having a small filtering area may be used when a degree of blocking artifact is small, and a deblocking filter having a wide filtering area may be used as the degree of blocking artifact increases.

For example, the first deblocking filter may be applied only to pixels within a 1-pixel unit or a 2-pixel unit from the boundary of the current block. The second deblocking filter having a larger range of filtering targets than that of the first deblocking filter may be applied only to pixels within a 3-pixel unit or a 4-pixel unit from the boundary of the current block. The third deblocking filter may be applied only to pixels within a certain pixel unit among a 5-pixel unit to an 8-pixel unit from the boundary of the current block. FIGS. 19A and 19B illustrate pixels located at a filtering boundary filtered by a deblocking filter. Pixels filtered by a first deblocking filter, a second deblocking filter, and a third deblocking filter will be described in detail with reference to FIGS. 19A and 19B below.

Referring to FIG. 19A, pixel values of pixels adjacent to left and right sides of a vertical boundary are defined as p0 to p7 and q0 to q7. Similarly, referring to FIG. 19B, pixel values of pixels adjacent to upper and lower sides of a horizontal boundary are defined as p0 to p7 and q0 to q7. Deblocking filtering based on a horizontal filtering boundary and deblocking filtering based on a vertical filtering boundary are different only in directions and are performed in the same manner.

The deblocking filtering unit 1630 may apply the selected deblocking filter to pixels adjacent to a boundary.

The first deblocking filter may be applied only to pixels within a 1-pixel unit or a 2-pixel unit from the boundary of the current block. When the first deblocking filter is applied to the pixels within the 1-pixel unit, the first deblocking filter is applied to the pixel values p0 and q0. When the first deblocking filter is applied to the pixels within the 2-pixel unit, the first deblocking filter may be applied to the pixel values p0, p1, q0, and q1. A range of target pixels to which the first deblocking filter is applied may be set to be greater than that in the above embodiment.

The second deblocking filter may be applied only to pixels within a 3-pixel unit or a 4-pixel unit from the boundary of the current block. When the second deblocking filter is applied to the pixels within the 3-pixel unit, the second deblocking filter is applied to the pixel values p0, p1, p2, q0, q1, and q2. When the second deblocking filter is applied to the pixels within the 4-pixel unit, the second deblocking filter may be applied to the pixel values p0, p1, p2, p3, q0, q1, q2, and q3. Target pixels to which the second deblocking filter is applied may be set differently from those in the above embodiment.

The third deblocking filter may be applied only to pixels within a certain pixel unit among a 5-pixel unit to an 8-pixel unit from the boundary of the current block. For example, when the third deblocking filter is applied to pixels within the 7-pixel unit, the third deblocking filter may be applied to the pixel values p0, p1, p2, p3, p4, p5, p6, q0, q1, q2, q3, q4, q5, and q6. Target pixel to which the third deblocking filter is applied may be set differently from that in the above embodiment.

The first deblocking filter may be a 4-tap filter. For example, the first deblocking filter may be a 4-tap filter using the pixel values p0, p1, q0, and q1. The second deblocking filter may be a 4-tap filter or a 5-tap filter. For example, the second deblocking filter may be a 4-tap filter using four pixels or a 5-tap filter using five pixels among the pixel values p0, p1, p2, p3, q0, q1, q2, and q3. The third deblocking filter may be a 9-tap filter, a 10-tap filter or an 11-tap filter. For example, the third deblocking filter may use nine, ten or eleven pixels among the pixel values p0, p1, p2, p3, p4, p5, p6, p7, q0, q1, q2, q3, q4, q5, q6, and q7. In one embodiment, the number of filter coefficients included in the first deblocking filter, the second deblocking filter, and the third deblocking filter may be changed.

The first deblocking filter, the second deblocking filter, and the third deblocking filter are set differently according to the positions of pixels to be filtered. For example, the third deblocking filter applied to the pixel value p0 may be a 5-tap filter. However, the third deblocking filter applied to the pixel value p2 may be a 4-tap filter. Alternatively, filter coefficients of the first deblocking filter, the second deblocking filter, and the third deblocking filter are set differently according to the positions of pixels to be filtered.

FIG. 20 is a block diagram illustrating a method of determining whether to apply deblocking filtering to pixels adjacent to a block boundary.

Referring to FIG. 20, in operation 2010, boundary strength is determined and whether deblocking filtering is to be applied according to the boundary strength is determined. Boundary strength may be determined for each pixel area of four rows or four columns in which a current pixel is located. Accordingly, boundary strength of pixels located in a pixel area determined by four rows or four columns may be determined to be the same. In one embodiment, boundary strength may be determined for each pixel area of eight rows or eight columns or more than eight rows or eight columns. A method of determining whether to apply deblocking filtering when it is determined whether to apply deblocking filtering in four rows or four columns will be described below.

Boundary strength is determined according to a plurality of conditions for a pixel area determined by four rows or four columns. For example, in FIG. 18A, when at least one of the following four conditions is satisfied, the deblocking filtering unit 1630 sets boundary strength to 1 or more. Conversely, when all of the following four conditions are not satisfied, the deblocking filtering unit 1630 sets boundary strength to zero.

1) Whether or not at least one of the square block 1840 and the square block 1845 has been intra predicted, 2) whether integer values of motion vectors used for the square block 1840 and the square block 1845 are different from each other.

3) whether reference pictures used for the square block 1840 and the square block 1845 are different from each other, and 4) whether there is at least one non-zero transform coefficient among transform coefficients of the square block 1840 and the square block 1845

When boundary strength is 0, deblocking filtering is not performed on pixels in a pixel area determined by four rows or four columns. Conversely, in operation 2020, when boundary strength is 1 or more, whether to perform deblocking filtering is determined again.

In operation 2020, when boundary strength is 1 or more, whether the changing amount d calculated by Equation 1 or 2 above is greater than a threshold $\beta$ is determined. When the changing amount d is greater than the threshold $\beta$, the deblocking filtering unit 1630 does not perform deblocking filtering on the pixels in the pixel area determined by four rows or four columns. In operation 2030, when the changing amount d is less than the threshold $\beta$, the deblocking filtering unit 1630 selects a deblocking filter to be applied to the pixels in the pixel region from a deblocking filter group.

In operation 2030, whether to use a first deblocking filter for each row or column is determined. The deblocking filtering unit 1630 may determine whether to use the first deblocking filter according to the conditions of Equations 3 to 5 above. In detail, when any of the conditions of Equations 3 to 5 is not satisfied, the deblocking filtering unit 1630 selects the first deblocking filter. Conversely, in operation 2040, when all the conditions of Equations 3 to 5 are satisfied, the deblocking filtering unit 1630 may select one of a second deblocking filter and a third deblocking filter.

In operation 2040, one of the second deblocking filter and the third deblocking filter is selected. In detail, the deblocking filtering unit 1630 may select one of the second deblocking filter and the third deblocking filter according to at least one of the condition of Equation 6 above and a condition regarding sizes of blocks adjacent to a boundary. The condition regarding the sizes of the blocks adjacent to the boundary may be that all blocks adjacent to the boundary have a size of 16×16 or more.

When the above conditions are satisfied, the deblocking filtering unit 1630 may select a third deblocking filter. Conversely, when the above conditions are not satisfied, the deblocking filtering unit 1630 may select the second deblocking filter having lower filtering strength than that of the third deblocking filter.

Operations 2010 to 2040 may be modified, based on various embodiments described in the specification.

In FIG. 19B, the deblocking filtering unit 1630 may apply a deblocking filter to neighboring pixels by differentiating between a vertical boundary and a horizontal boundary of a current block. For deblocking filtering of pixels adjacent to the horizontal boundary of the current block, data of pixels located in upper rows of the current block is required. When pixels within an 8-pixel unit distance from a boundary of the current block are used by the third deblocking filter, eight pixels above the horizontal boundary of the current block are required for deblocking filtering by the third deblocking filter. Therefore, according to a raster scan order, although pixels located at an upper side of the current block have been decoded before the current block, the pixels are continuously stored in a memory for deblocking filtering of the current block. Thus, when the third deblocking filter is applied, a large storage space of memory is required to store samples adjacent to an upper side of the horizontal boundary of the current block.

Therefore, the deblocking filtering unit 1630 may use only four pixels above the horizontal boundary of the current block when the third deblocking filter is applied to samples adjacent to the horizontal boundary of the current block. Accordingly, a burden on the memory due to the third deblocking filter may be reduced.

For example, in FIG. 19B, the deblocking filtering unit 1630 may select one of the third deblocking filter and the second deblocking filter according to a condition of Equation 7 obtained from a modification to Equation 6.

$$p*\text{abs}(p3-p0)+q*\text{abs}(q7-q0)<\beta/8 \quad \text{[Equation 7]}$$

When only four pixels arranged above the horizontal boundary of the current block are used, pixel values p4 to p7 cannot be used and thus a pixel value p3 is used instead of the pixel value p7 in Equation 7. Weights p and q for abs (p3-p0) and abs (q7-q0) are required to correct the difference between the distance between the p7 and p0 and the distance between the p3 and p0. The deblocking filtering unit 1630 may select the third deblocking filter when the condition of Equation 7 is satisfied, and select the second deblocking filter otherwise.

The deblocking filtering unit 1630 may apply the third deblocking filter only to the pixel values p0 to p3 at the top of the horizontal boundary. Therefore, even when seven pixel values q0 to q6 under the horizontal boundary is deblocking-filtered, the pixel values p4 to p6 at the above of the horizontal boundary may not be deblocking-filtered. Alternatively, the deblocking filtering unit 1630 may deblocking-filter pixels around the horizontal boundary by using the pixel values p0 to p3 and q0 to q7 without using the pixel values p4 to p7.

The deblocking filtering unit 1630 may select a deblocking filter for pixels adjacent to the vertical boundary according to the condition of Equation 6. When the third deblocking filter is selected, the deblocking filtering unit 1630 may apply the third deblocking filter to pixels within a certain pixel unit among a 5-pixel unit to an 8-pixel unit from the vertical boundary.

Figure 21:
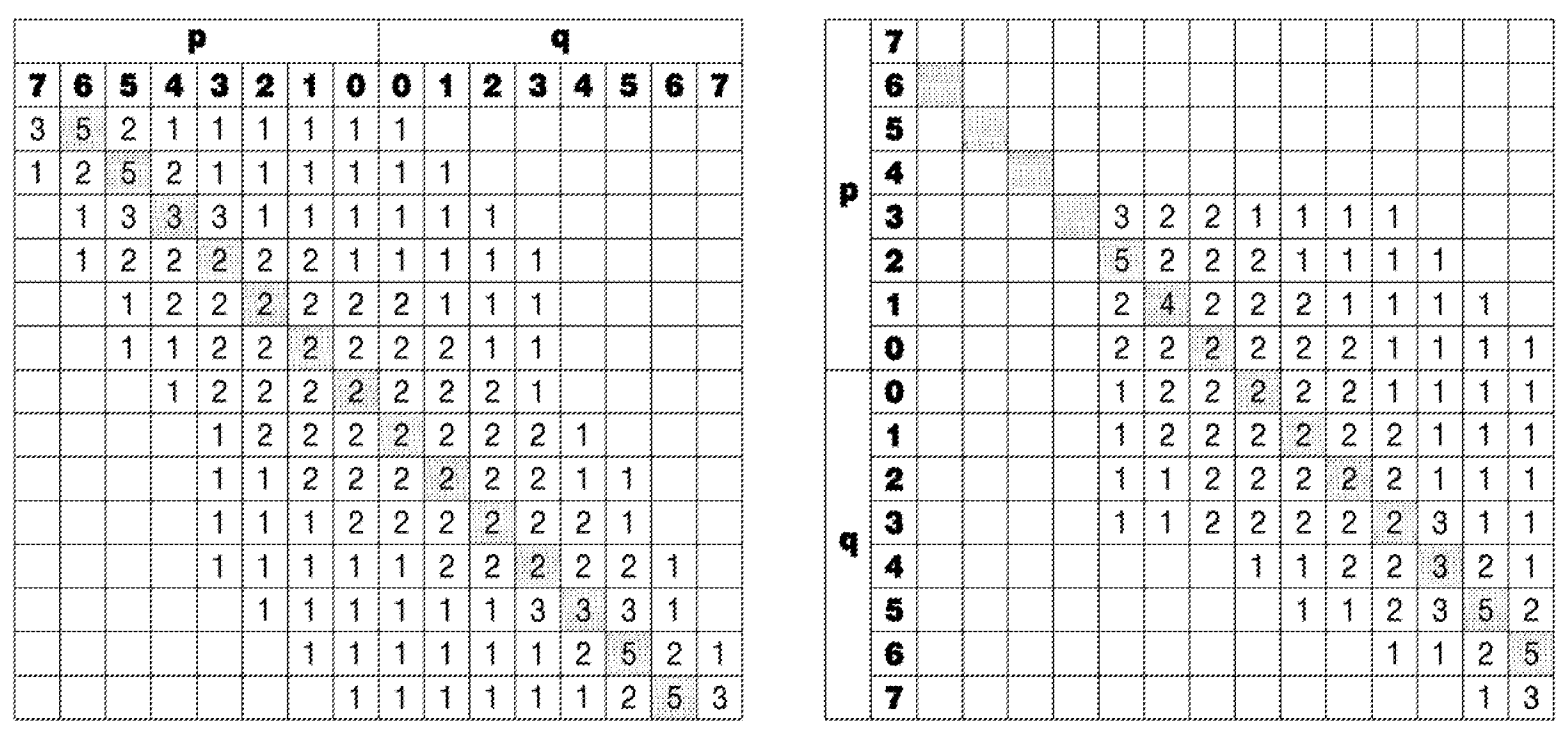

FIG. 21 illustrates a third deblocking filter used by the deblocking filtering unit 1630. A left table of FIG. 21 shows a third deblocking filter used for pixels around a vertical boundary. According to the left table of FIG. 21, deblocking filtering is applied to pixel values p0 to p6 and q0 to q6 by the third deblocking filter. Pixel values p0' to p6' and q0' to q6' filtered by the third deblocking filter according to the left table of FIG. 21 are as follows.

$$p6'=(3*p7+5*p6+2*p5+p4+p3+p2+p1+p0+q0)>>4$$

$$p5'=(p7+2*p6+5*p5+2*p4+p3+p2+p1+p0+q0+q1)>>4$$

$$p4'=(p6+3*p5+3*p4+3*p3+p2+p1+p0+q0+q1+q2)>>4$$

$$p3'=(p6+2*p5+2*p4+2*p3+2*p2+2*p1+p0+q0+q1+q2+q3)>>4$$

$$p2'=(p5+2*p4+2*p3+2*p2+2*p1+2*p0+2*q0+q1+q2+q3)>>4$$

$$p1'=(p5+p4+2*p3+2*p2+2*p1+2*p0+2*q0+2*q1+q2+q3)>>4$$

$$p0'=(p4+2*p3+2*p2+2*p1+2*p0+2*q0+2*q1+2*q2+q3)>>4$$

$$q0'=(p3+2*p2+2*p1+2*p0+2*q0+2*q1+2*q2+2*q3+q4)>>4$$

$$q1'=(p3+p2+2*p1+2*p0+2*q0+2*q1+2*q2+2*q3+q4+q5)>>4$$

$$q2'=(p3+p2+p1+2*p0+2*q0+2*q1+2*q2+2*q3+2*q4+q5)>>4$$

$$q3'=(p3+p2+p1+p0+q0+2*q1+2*q2+2*q3+2*q4+2*q5+q6)>>4$$

$$q4'=(p2+p1+p0+q0+q1+q2+3*q3+3*q4+3*q5+q6)>>4$$

$$q5'=(p1+p0+q0+q1+q2+q3+2*q4+5*q5+2*q6+q7)>>4$$

$$q6'=(p0+q0+q1+q2+q3+q4+2*q5+5*q6+3*q7)>>4$$

A right table of FIG. 21 shows a third deblocking filter used for pixels around a horizontal boundary when pixel values p4 to p7 above the horizontal boundary are not used for memory resource efficiency. According to the right table of FIG. 21, deblocking filtering is applied to the pixel values p0 to p3 and q0 to q6 by the third deblocking filter. Pixel values p0' to p3' and q0' to q6' filtered by the third deblocking filter according to the left table of FIG. 21 are as follows.

$$p2'=(3*p3+5*p2+2*p1+2*p0+q0+q1+q2+q3)>>4$$

$$p1'=(2*p3+2*p2+4*p1+2*p0+2*q0+2*q1+q2+q3)>>4$$

$$p0'=(2*p3+2*p2+2*p1+2*p0+2*q0+2*q1+2*q2+2*q3)>>4$$

$$q0'=(p3+2*p2+2*p1+2*p0+2*q0+2*q1+2*q2+2*q3+q4)>>4$$

$$q1'=(p3+p2+2*p1+2*p0+2*q0+2*q1+2*q2+2*q3+q4+q5)>>4$$

$$q2'=(p3+p2+p1+2*p0+2*q0+2*q1+2*q2+2*q3+2*q4+q5)>>4$$

$$q3'=(p3+p2+p1+p0+q0+2*q1+2*q2+2*q3+2*q4+2*q5+q6)>>4$$

$$q4'=(p2+p1+p0+q0+q1+q2+3*q3+3*q4+3*q5+q6)>>4$$

$$q5'=(p1+p0+q0+q1+q2+q3+2*q4+5*q5+2*q6+q7)>>4$$

$$q6'=(p0+q0+q1+q2+q3+q4+2*q5+5*q6+3*q7)>>4$$

When the pixel values p4 to p7 above the horizontal boundary are used for deblocking-filtering the pixels around the horizontal boundary, the pixel values p0' to p3' and q0' to q6' may be the same as the pixel values p0' to p3' and q0' to q6' deblocking-filtered according to the left table of FIG. 21.

Coefficients of the deblocking filters of FIG. 21 may vary according to an embodiment.

Figure 22:
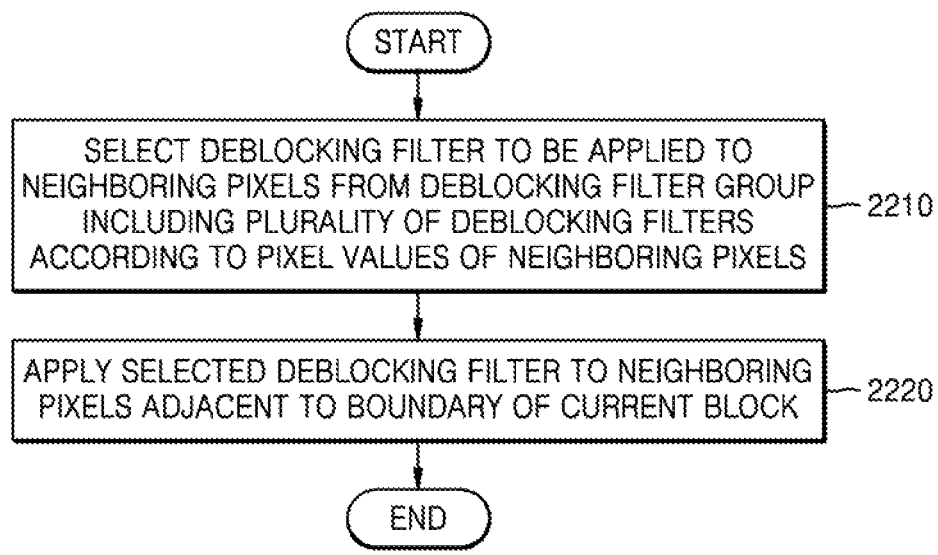
FIG. 22 is a flowchart of a video decoding method based on coding units, according to an embodiment of the present disclosure.

FIG. 22 is a flowchart of a video decoding method 2200 based on coding units according to an embodiment of the present disclosure.

In operation 2210, when a deblocking filter is applied to neighboring pixels, a deblocking filter to be applied to the neighboring pixels is selected from among a plurality of deblocking filters according to pixel values of the neighboring pixels and a size of a current block. The plurality of deblocking filters may include three or more deblocking filters having different neighboring samples to which deblocking filtering is applied.

A deblocking filter to be applied to the neighboring pixels may be selected by comparing a threshold determined by a quantization parameter of the current block and a quantization parameter of a neighboring block with difference information between neighboring samples. The difference information may include at least one of the difference in pixel values between consecutive pixels of the current block, the difference in pixel values between consecutive pixels of the neighboring block, or the difference in pixel values between a pixel of the current block and a pixel of the neighboring block.

Alternatively, a deblocking filter to be applied to the neighboring pixels may be selected according to a size of the current block and a size of the neighboring block.

In operation 2220, a deblocking filter selected for neighboring pixels adjacent to a boundary of the current block is applied.

A first deblocking filter may be applied only to pixels within a 1-pixel unit distance or a 2-pixel unit distance from the boundary of the current block. A second deblocking filter may be applied only to pixels within a 3-pixel unit distance or a 4-pixel unit distance from the boundary of the current block. A third deblocking filter may be applied only to pixels within a 5-pixel unit distance, a 6-pixel unit distance, a 7-pixel unit distance or an 8-pixel unit distance from the boundary of the current block.

When the third deblocking filter is applied to the neighboring pixels, neighboring pixels adjacent to a horizontal boundary of the current block may be deblocking-filtered using four pixels above the horizontal boundary and eight pixels below the horizontal boundary. Neighboring pixels adjacent to a vertical boundary of the current block may be deblocking-filtered using eight pixels to the right of the vertical boundary and eight pixels to the left of the vertical boundary.

The video decoding method 2200 may include decoding the current block according to encoding information of the current block. The video decoding method 2200 may further include determining whether to apply a deblocking filter to neighboring pixels according to encoding information of the current block and a neighboring block of the current block and pixel values of the neighboring pixels.

In one embodiment, whether to apply a deblocking filter to the neighboring pixels may be determined according to whether at least one of the current block or the neighboring block has been intra-predicted. When the current block and the neighboring block have been inter-predicted, whether to apply a deblocking filter to the neighboring pixels may be determined according to the difference in size between a motion vector used for prediction of the current block and a motion vector used for prediction of the neighboring block. Alternatively, whether to apply a deblocking filter to the neighboring pixels may be determined according to whether a reference picture used for prediction of the current block and a reference picture used for prediction of the neighboring block are the same. Alternatively, whether to apply a deblocking filter to the neighboring pixels may be determined by comparing difference information between neighboring samples with a threshold determined by a quantization parameter of the current block and a quantization parameter of the neighboring block.

The functions or operations performed by the video decoding apparatus 1600 of FIG. 16 may be easily included in the video decoding method 2200 by a technician of ordinary skill in the art.

Figure 23:
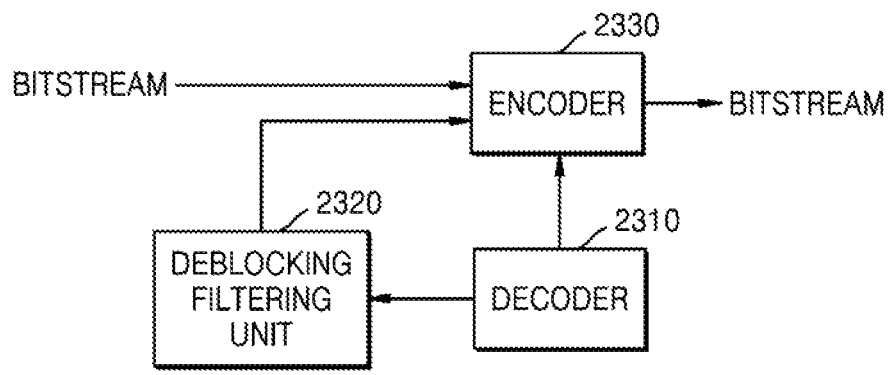
FIG. 23 is a block diagram of a video encoding apparatus which performs deblocking filtering based on coding units according to a tree structure.

FIG. 23 is a block diagram of a video encoding apparatus 2300 which performs deblocking filtering based on coding units of a tree structure.

The video encoding apparatus 2300 includes a decoder 2310, a deblocking filtering unit 2320, and an encoder 2330. Although FIG. 23 illustrates the decoder 2310, the deblocking filtering unit 2320, and the encoder 2330 as separate components, the decoder 2310, the deblocking filtering unit 2320, and the encoder 2330 may be combined as the same component according to one embodiment.

Although FIG. 23 illustrates the decoder 2310, the deblocking filtering unit 2320, and the encoder 2330 as components included in one device, devices performing functions of the decoder 2310, the deblocking filtering unit 2320, and the encoder 2330 are not necessarily located physically adjacent to another. Thus, in one embodiment, the decoder 2310, the deblocking filtering unit 2320, and the encoder 2330 may be dispersed.

The decoder 2310 generates a pixel value of a current block by reconstructing the current block, based on encoding information of the current block.

The deblocking filter unit 2320 determines whether to apply a deblocking filter to neighboring pixels according to encoding information of a current block and a neighboring block of the current block and pixel values of neighboring pixels.

When a deblocking filter is applied to the neighboring pixels, the deblocking filter unit 2320 selects a deblocking filter to be applied to the neighboring pixels from among a plurality of deblocking filters according to the pixel values of the neighboring pixels.

The deblocking filter unit 2320 applies the selected deblocking filter to the neighboring pixels.

The decoder 2310 and the deblocking filter unit 2320 may perform the functions described above with respect to the decoder 1620 and the deblocking filtering unit 1630 of the video decoding apparatus 1600 of FIG. 16.

The encoder 2330 encodes the encoding information of the current block and the neighboring block by encoding a current picture including the current block, and encodes other pictures by using the current block to which the deblocking filter is applied.

Figure 24:
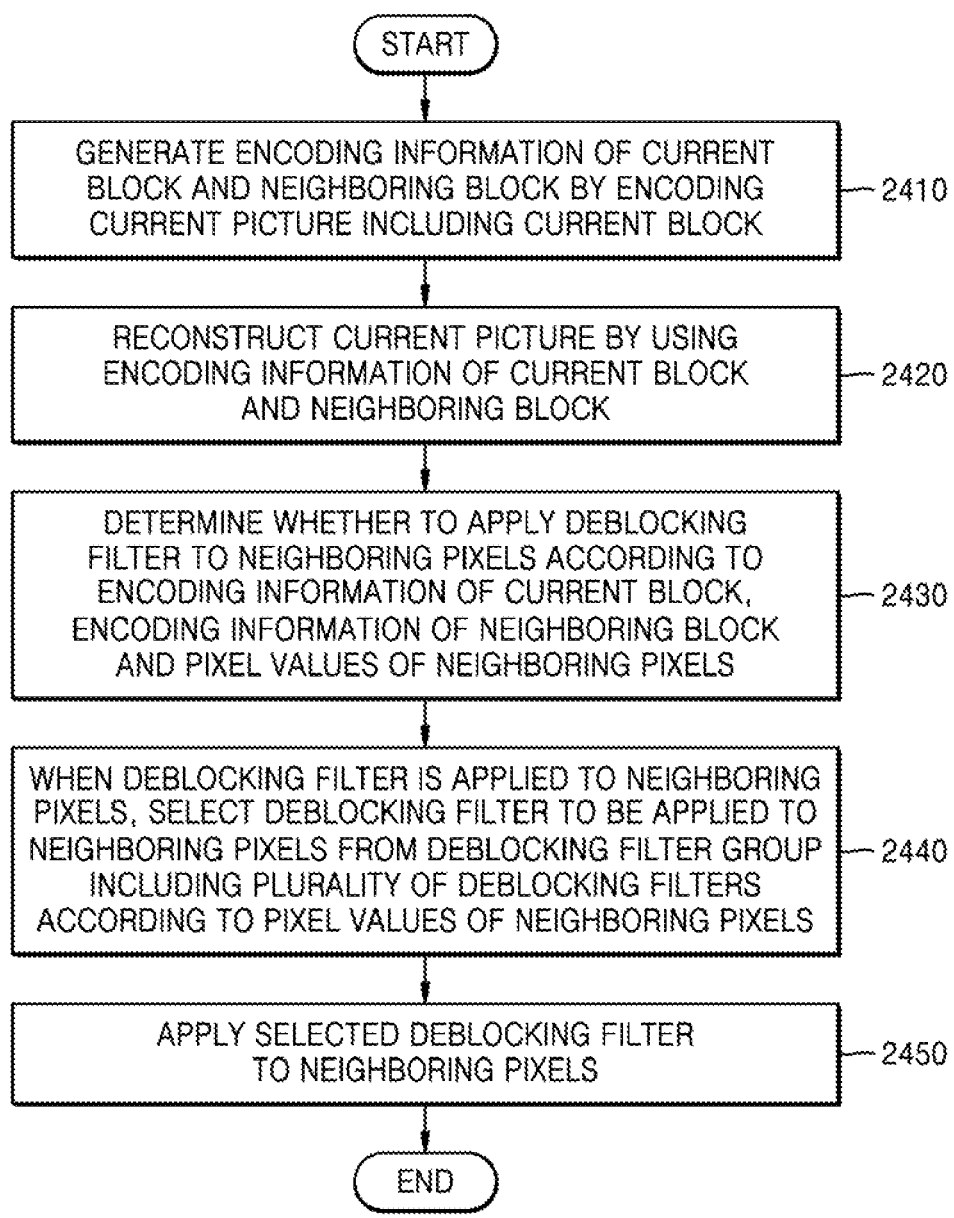
FIG. 24 is a flowchart of a video encoding method based on coding units, according to an embodiment of the present disclosure.

FIG. 24 is a flowchart of a video encoding method 2400 based on coding units according to an embodiment of the present disclosure.

In operation 2410, encoding information of a current block and a neighboring block of the current block is generated by encoding a current picture including the current block.

In operation 2420, a pixel value of the current block is generated by reconstructing the current block, based on the encoding information of the current block.

In operation 2430, whether to apply a deblocking filter to neighboring pixels is determined according to the encoding information of the current block and the neighboring block of the current block and pixel values of neighboring pixels.

In operation 2440, when a deblocking filter is applied to the neighboring pixels, a deblocking filter to be applied to the neighboring pixels is selected from a deblocking filter group including a plurality of deblocking filters according to pixel values of the neighboring pixels.

In operation 2450, the selected deblocking filter is applied to the neighboring pixels.

The functions or operations performed by the video decoding apparatus 2300 of FIG. 23 may be easily included in the video encoding method 2400 by a technician of ordinary skill in the art.

The deblocking filter group includes three or more deblocking filters having different ranges of neighboring samples to which deblocking filtering is applied.

Spatial-domain image data may be encoded for each of coding units of a tree structure by a video encoding technique based on the coding units of the tree structure and be reconstructed by decoding each of largest coding units by a video decoding technique based on coding units of a tree structure as described above with reference to FIGS. 1 to 24, thereby reconstructing a picture and a video which is a picture sequence. The reconstructed video may be reproduced by a reproducing device, stored in a storage medium, or transmitted via a network.

The above-described embodiments of the present disclosure may be written as a computer executable program and implemented by a general-purpose digital computer which operates the program via a computer-readable recording medium.

While the present disclosure has been described above in connection with specific best embodiments, other inventions derivable by making alternatives, modifications, and changes in the present disclosure will be apparent to those of ordinary skill in the art, in view of the foregoing description. In other words, the appended claims should be understood to cover all such alternatives, modifications and changes. Therefore, all the matters described in the present specification and illustrated in the drawings should be interpreted in an illustrative and non-limiting sense.

The invention claimed is:

1. A video decoding method, the method comprising:
   if a boundary between a first block and a second block is a horizontal boundary and a size of the first block and a size of the second block are equal to or greater than a predetermined size, determining a first range in an upper side of the boundary for deblocking-filtering to be a first value and a second range in a lower side of the boundary for the deblocking-filtering to be a second value, the first value being less than the second value; and
   performing deblocking-filtering on samples corresponding to the first range and the second range,
   wherein:
      the first range indicates a number of samples in a vertical direction to be deblocking-filtered among a plurality of samples included in the first block,
      the second range indicates a number of samples in the vertical direction to be deblocking-filtered among a plurality of samples included in the second block, and
      if at least one of the size of the first block and the size of the second block is less than the predetermined size, the first range and the second range are determined to be the same as the first value.

2. The video decoding method of claim 1, wherein if the boundary between the first block and the second block is a vertical boundary, a third range in a left side of the vertical boundary for deblocking-filtering and a fourth range in a right side of the vertical boundary for deblocking-filtering are the same.

3. The video decoding method of claim 2, wherein the third range and the fourth range are determined to be one of a third value and a fourth value according to the size of the first block and the size of the second block.

* * * * *